US010855066B2

(12) United States Patent
Elliott et al.

(10) Patent No.: US 10,855,066 B2
(45) Date of Patent: Dec. 1, 2020

(54) ADJUSTABLE MOUNTING ASSEMBLY

(71) Applicant: Zetr Pty Ltd, New South Wales (AU)

(72) Inventors: Garth Elliott, New South Wales (AU); Matthias Pittner, New South Wales (AU)

(73) Assignee: ZETR PTY LTD, New South Wales (AU)

( * ) Notice: Subject to any disclaimer, the term of this patent is extended or adjusted under 35 U.S.C. 154(b) by 218 days.

(21) Appl. No.: 15/981,641

(22) Filed: May 16, 2018

(65) Prior Publication Data

US 2018/0375310 A1    Dec. 27, 2018

Related U.S. Application Data

(63) Continuation-in-part of application No. PCT/AU2016/051098, filed on Nov. 16, 2016.

(30) Foreign Application Priority Data

Nov. 16, 2015 (AU) .................................. 2015904713

(51) Int. Cl.
*H02G 3/00* (2006.01)
*H02G 3/12* (2006.01)
(Continued)

(52) U.S. Cl.
CPC ........... *H02G 3/123* (2013.01); *H01R 13/512* (2013.01); *H01R 13/748* (2013.01); *H02G 3/086* (2013.01);
(Continued)

(58) Field of Classification Search
CPC .......... H02G 3/123; H02G 3/086; H02G 3/18; H02R 13/748; H02R 13/512;
(Continued)

(56) References Cited

U.S. PATENT DOCUMENTS 2,657,250 A    10/1953 William
3,710,972 A     1/1973 Barry
(Continued)

OTHER PUBLICATIONS

"AU 2015904713", Australian Patent Office Search Report, dated Oct. 12, 2016, 9 pages.
(Continued)

*Primary Examiner* — Pete T Lee
(74) *Attorney, Agent, or Firm* — Kilpatrick Townsend & Stockton LLP

(57) ABSTRACT

Disclosed herein is an adjustable mounting assembly for mounting an electrical module relative to a supporting surface. The assembly comprises: mounting means adapted for embedded anchorage relative to the supporting surface; a holder having an aperture for receiving and holding the electrical module, the holder being adapted for moveable engagement with the mounting means to facilitate adjustment of a position of the electrical module relative to the supporting surface; and fastening means for fastening the holder to the mounting means, the fastening means being accessible for unfastening and refastening via the aperture to facilitate re-adjustment of the position of the electrical module relative to the supporting surface.

20 Claims, 23 Drawing Sheets

(51) Int. Cl.
*H01R 13/512* (2006.01)
*H01R 13/74* (2006.01)
*H02G 3/08* (2006.01)
*H02G 3/18* (2006.01)
*H01R 24/76* (2011.01)
*H01R 103/00* (2006.01)

(52) U.S. Cl.
CPC ............... *H02G 3/18* (2013.01); *H01R 24/76* (2013.01); *H01R 2103/00* (2013.01)

(58) Field of Classification Search
CPC .... H01R 13/512; H01R 13/748; H01R 24/76; H01R 2103/00
USPC .......................................................... 174/50
See application file for complete search history.

(56) References Cited

U.S. PATENT DOCUMENTS

| | | | | |
|---|---|---|---|---|
| 4,331,832 A | * | 5/1982 | Curtis | H02G 3/185 |
| | | | | 174/57 |
| 4,599,485 A | | 7/1986 | Smolik | |
| 5,084,596 A | | 1/1992 | Borsh et al. | |
| 5,289,934 A | | 3/1994 | Smith et al. | |
| 5,723,817 A | * | 3/1998 | Arenas | H02G 3/14 |
| | | | | 174/66 |
| 7,306,482 B1 | * | 12/2007 | Kidman | H01R 13/73 |
| | | | | 439/538 |
| 7,757,875 B2 | * | 7/2010 | Lalancette | H02G 3/086 |
| | | | | 220/3.7 |
| 7,786,379 B1 | * | 8/2010 | Kwong | H02G 3/20 |
| | | | | 174/58 |
| 7,807,923 B2 | * | 10/2010 | Moran | H02G 9/10 |
| | | | | 174/50 |
| 8,076,578 B1 | | 12/2011 | Gretz | |
| 8,371,465 B2 | | 2/2013 | Denier | |
| 8,633,384 B1 | | 1/2014 | Shotey et al. | |
| 9,853,433 B1 | * | 12/2017 | Gretz | H02G 3/185 |
| 2006/0086525 A1 | * | 4/2006 | Xu | H02G 3/14 |
| | | | | 174/66 |
| 2011/0266022 A1 | | 11/2011 | Jafari | |
| 2014/0224792 A1 | * | 8/2014 | Beneke | H02G 3/123 |
| | | | | 220/3.3 |

OTHER PUBLICATIONS

"PCT/AU2016/051098", International Written Opinion, dated Feb. 7, 2017, 5 pages.

"PCT/AU2016/051098", International Search Report, dated Feb. 7, 2017, 4 pages.

EP16865297.2, "Extended European Search Report", dated Jun. 11, 2019, 9 pages.

* cited by examiner

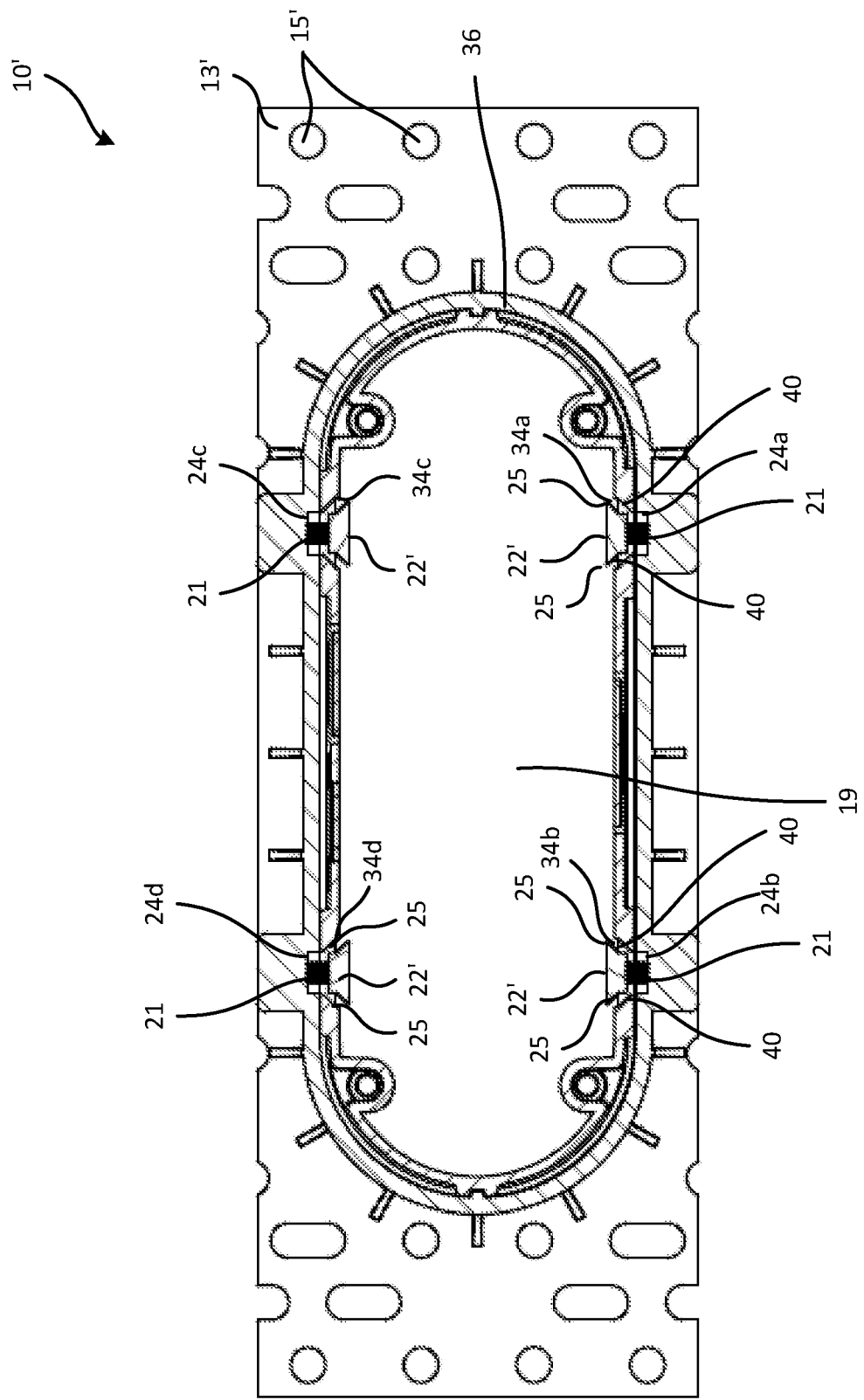

ADJUSTABLE MOUNTING ASSEMBLY

CROSS-REFERENCES TO RELATED APPLICATIONS

This application claims priority to and is a continuation-in-part of International Patent Application No. PCT/AU2016/051098, filed Nov. 16, 2016; which claims priority from Australian Patent Application No. AU 2015904713, filed Nov. 16, 2015, the entire contents of which are incorporated by reference herein in their entirety for all purposes.

FIELD OF THE INVENTION

This disclosure relates to an adjustable mounting assembly for mounting an electrical module relative to a supporting surface.

BACKGROUND OF THE INVENTION

Indoor electrical outlets are usually placed where they can be easily accessed by users, meaning that electrical outlets are usually visible and can therefore influence the aesthetic appearance of an indoor surface, such as a wall.

Trimmed electrical outlets can be aesthetically unappealing as they protrude outwards from an indoor surface. Electrical outlets can be trimless and recessed into the surrounding surface to provide a flush finish. While these trimless electrical outlets are usually more aesthetically pleasing than trimmed electrical outlets, they can be laborious to install, often requiring accurate positioning during installation to achieve a flush finish with the surface on which the installation is performed. Furthermore, walls of different wall thicknesses require different positioning for a flush finish. Therefore any post-installation work on the surface, such as re-rendering, can affect the original flush finish.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

BRIEF SUMMARY OF THE INVENTION

According to some embodiments of the present invention, there is provided an adjustable mounting assembly for mounting an electrical module relative to a supporting surface, comprising: mounting means adapted for embedded anchorage relative to the supporting surface; a holder having an aperture for receiving and holding the electrical module, the holder being adapted for moveable engagement with the mounting means to facilitate adjustment of a position of the electrical module relative to the supporting surface; and fastening means for fastening the holder to the mounting means, the fastening means being accessible for unfastening and refastening via the aperture to facilitate re-adjustment of the position of the electrical module relative to the supporting surface.

The holder may include an engaging surface shaped to correspond with a corresponding engaging surface of the mounting means to facilitate the movable engagement. The engaging surface of the holder has an oval-shaped cross-section, and the corresponding engaging surface of the mounting means includes a similar oval-shaped cross-section.

The mounting means may include an opening for receiving the holder. The fastening means, in a fastened configuration, may be clear of the opening of the mounting means.

The holder may include at least one angled contacting surface for contact with at least one corresponding angled contacting surface of the fastening means. The fastening means may include a dovetail-shaped washer for contacting the at least one angled contacting surface.

The supporting surface may be a substantially flat supporting surface, and the mounting means may include a substantially flat portion for substantial alignment with the flat supporting surface. The supporting surface may be any one of a wall surface, a ceiling surface, and a floor surface.

The assembly may further comprise a faceplate for covering an exposing side of the aperture of the holder. The faceplate may be adapted to magnetically attach to the electrical module. The faceplate may include one or more magnets.

The assembly may further comprise a back cover for covering an exposed side of the aperture of the holder. The back cover may be made of silicon.

In some embodiments an adjustable mounting assembly for mounting an electrical module relative to a supporting surface according to the invention includes: a mounting plate adapted for embedded anchorage relative to a supporting surface, the mounting plate including a mounting plate aperture; a holder having a module aperture for receiving and holding the electrical module and configured for moveable engagement with the mounting plate through the mounting plate aperture to facilitate adjustment of a position of the electrical module relative to the supporting surface; and a fastener configured to fasten the holder to the mounting plate, the fastener being accessible for unfastening and refastening through the module aperture to facilitate readjustment of the position of the electrical module relative to the supporting surface.

In some embodiments the fastener can include a ring having an interior surface that defines a ring aperture corresponding in size to the mounting plate aperture. The ring can be attached to the mounting plate by one or more screws or another fastening device such that the ring aperture is aligned with the mounting plate aperture. In other embodiments the mounting plate can include a substantially flat portion and a flange portion that extends away from the substantially flat portion. The flange portion can define the mounting plate aperture and the fastener can attach the holder to the mounting plate through the flange portion.

As used herein, except where the context requires otherwise, the term "comprise" and variations of the term, such as "comprising", "comprises" and "comprised", are not intended to exclude further additives, components, integers or steps.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 11A is a back view of the second arrangement of the adjustable mounting assembly of FIGS. 10A-10C in an assembled form;

DETAILED DESCRIPTION OF THE INVENTION

Disclosed herein is an adjustable mounting assembly for mounting an electrical module relative to a supporting surface. The disclosed assembly, when installed to the supporting surface, enables a flush finish of the electrical module with the supporting surface. As described further below, the disclosed assembly allows for adjustment of the position of the electrical module relative to the supporting surface during installation, as well as allowing for re-adjustment after installation, for example, when another layer of rendering is applied which may be affect the original flush finishing.

The supporting surface may be a surface of any supporting structure. For example, the supporting structure may be an internal building structure, such as a wall, a floor or a ceiling. As another example, the supporting structure may be a non-building-related structure or aesthetic finish, such as a joinery, a wardrobe or an island bench. The supporting surface can be of any suitable material, wet or dry installed surface, such as wood or timber, plasterboard, stone, tile, cement, glass, metal or the like. While the following description uses a wall surface as a non-limiting example of a supporting surface, the description is understood to be applicable to other types of supporting surfaces.

The disclosed assembly may be sold, packaged or otherwise provided in an assembled form, a partly assembled, or an unassembled form. In a partly assembled or an unassembled form, the assembly may be assembled by, for example, a builder or tradesman on site. While some description herein is directed to the disclosed assembly when assembled or installed to a wall surface, it should not be taken as describing that the disclosed assembly is limited to an assembled form.

Figure 1:
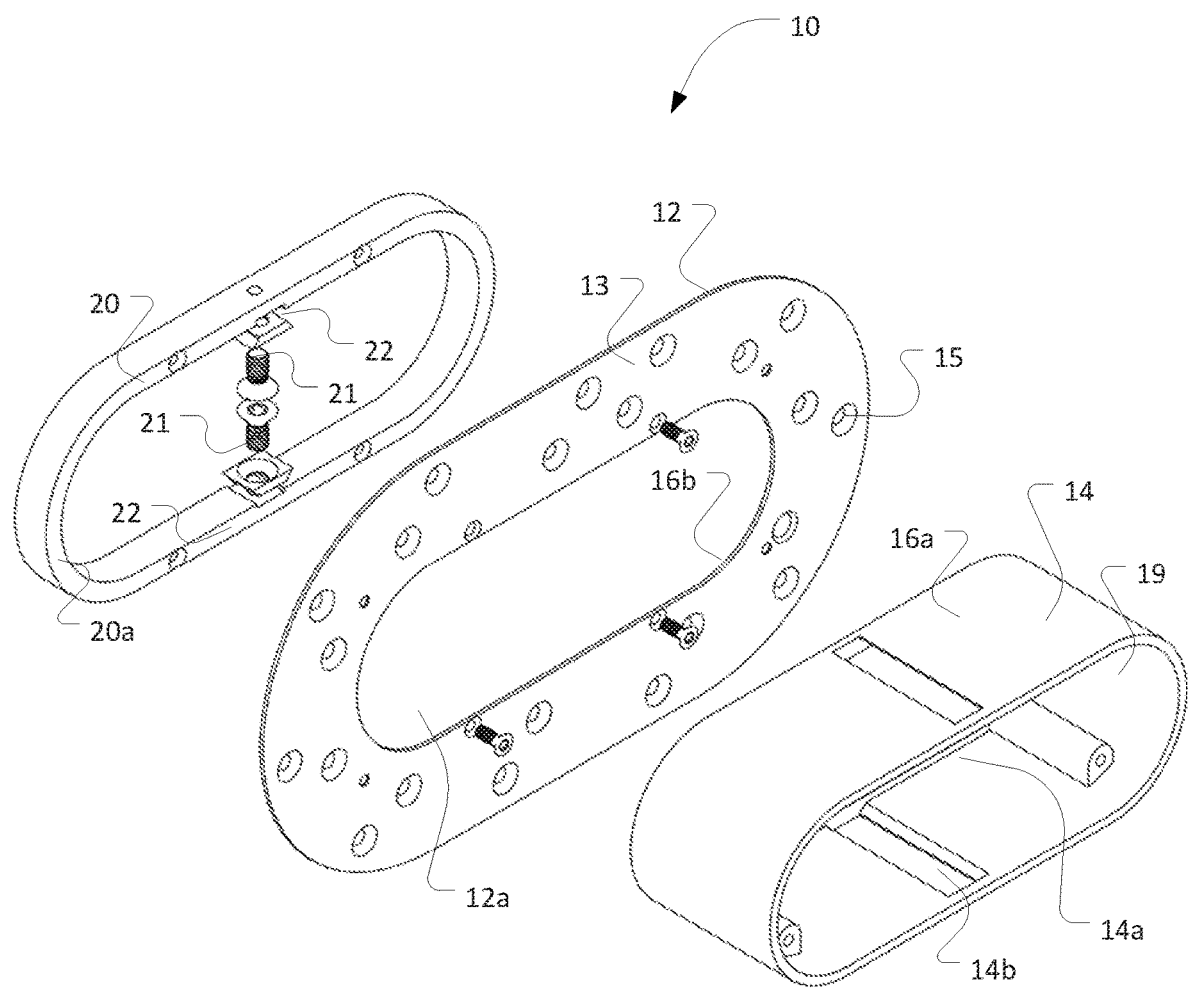
FIG. 1 illustrates an exploded view of one arrangement of an adjustable mounting assembly in a unassembled form.

FIGS. 1, 2A, 2B, 3A and 3B shows an arrangement of the disclosed assembly 10. FIG. 1 illustrates the assembly 10 in an unassembled form, while FIGS. 2A, 2B, 3A and 3B illustrate the assembly 10 in an assembled form. The assembly 10 comprises mounting means 12, a holder 14 and fastening means 20. The mounting means 12 is adapted for embedded anchorage relative to the supporting surface (not shown). In one case, where the assembly is to be installed in a wall, the mounting means 12 is embedded at least partially below the wall surface. For example, for a flat supporting surface, such as a vertical wall, the mounting means 12 includes a substantially flat portion 13 for embedment in substantial alignment with the wall. In this example, the substantially flat portion 13 has an annular shape, and the embedment may be achieved by plastering over the annularly-shaped substantially flat portion 13. In some cases, the embedment (such as by the plastering) may provide sufficient anchorage of the mounting means to the wall. In other cases, in-wall anchors or construction adhesive (not shown) may be used to assist with the anchorage of the mounting means 12 to the wall. For example, anchoring holes 15 are adapted to receive in-wall anchors for additional anchorage.

In the arrangement shown, the annularly-shaped mounting means 12 includes an opening 12a adapted to receive the holder 14. In another arrangement (not shown), the substantially flat portion of the mounting means may be half-annular (e.g. taking a shape of only the bottom half of mounting means 12 shown in FIGS. 2A and 2B), and such mounting means includes a cradle (instead of an opening) adapted to receive the holder 14.

Figure 7:
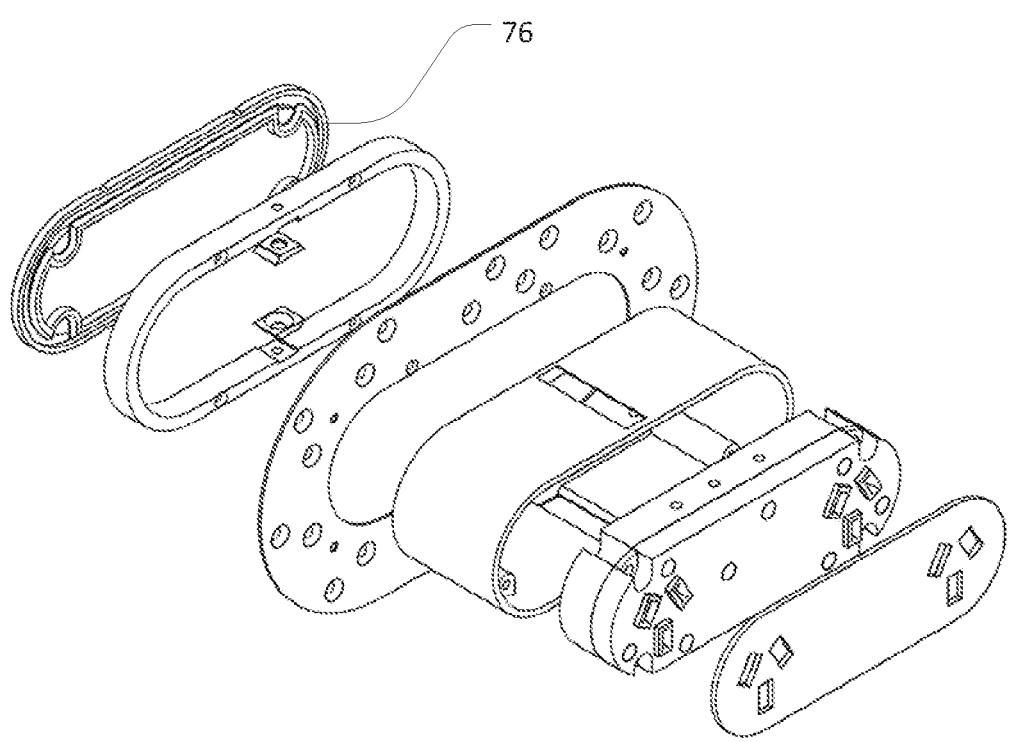
FIG. 7 is an exploded view of the adjustable mounting assembly shown in FIG. 1 and provided with a silicon cover, an electrical receptacle and a faceplate.
Figure 8:
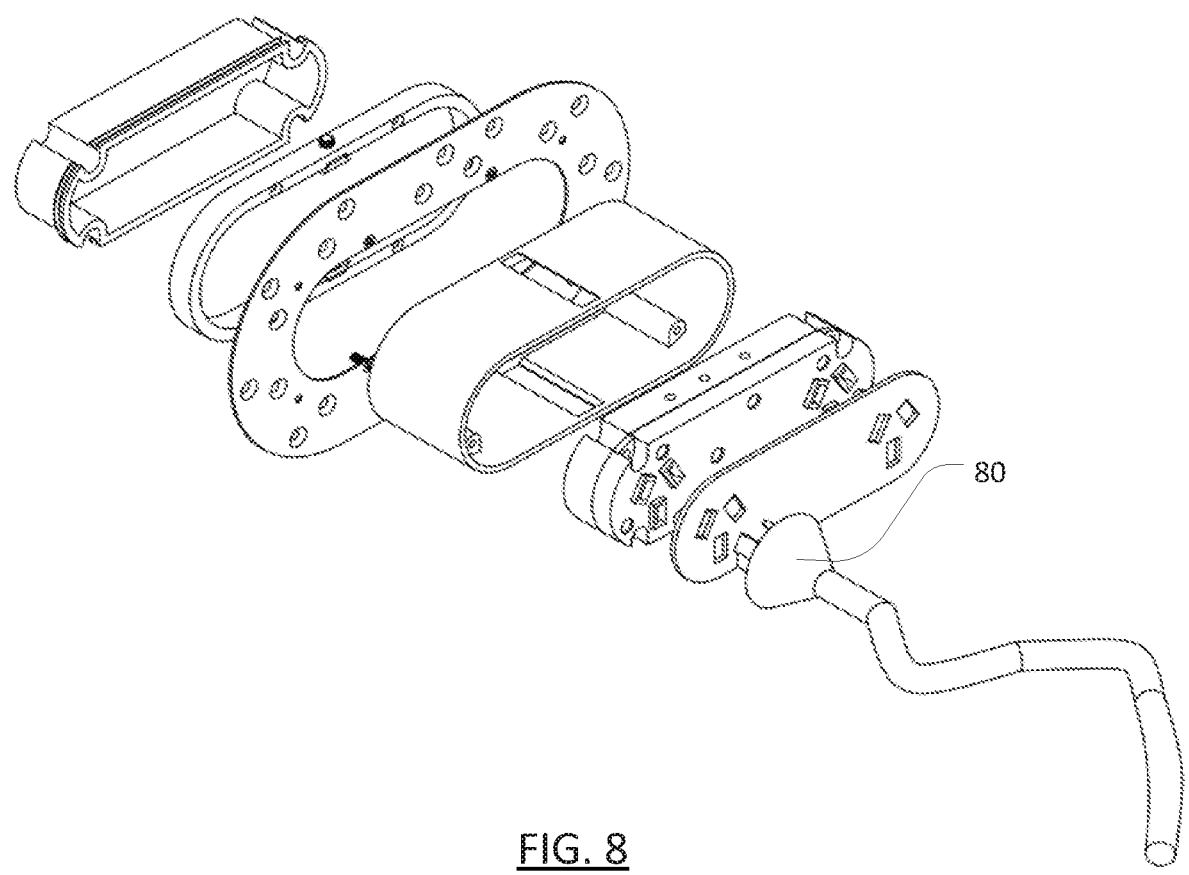
FIG. 8 is an exploded view of the adjustable mounting assembly shown in FIG. 1 and provided with a silicon box, an electrical receptacle and a faceplate with a male electrical plug.

The holder 14 includes an aperture 19 for receiving and holding an electrical module, such as an electrical receptacle (see FIGS. 6 and 7) or an electrical switch assembly (see FIG. 8). The holder 14 is adapted for moveable engagement with the mounting means 12. The movable engagement facilitates adjustment of a relative position between the holder 14 and the mounting means 12, thereby facilitating adjustment of a position of the electrical module relative to the supporting surface. Such adjustment allows the assembly 10 to be used to achieve a flush finish for a range of wall thicknesses.

The holder 14 includes one or more tracks (e.g. 14a and 14b) for engaging fastening means 20. The fastening means 20 is adapted for fastening the holder 14 to the mounting means 12, for example, once a desired relative position of the electrical module relative to the supporting surface is reached. In the arrangement shown in FIG. 1, the fastening means 20 includes rim 20a, one or more screws 21 and one or more washers 22. In this illustrated arrangement, the rim 20a is annular. In the arrangement where the mounting means is half-annular, the rim is also half-annular. In either arrangement, the rim 20a is secured or otherwise attached to the substantially flat portion 13 of the mounting means 12, for example by adhesives such as epoxy glue or fasteners such as screws. The rim 20a defines an opening 20b no smaller than the opening 12a so as not to obstruct movement of the holder 14 relative to the mounting means 12. To engage with the one or more screws 21, the rim 20a may include one or more corresponding threaded screw holes (not shown), and/or the fastening means 20 may include a corresponding nut (not shown). Two washers, one for an upper arm and another for a lower arm of the rim 20a, are illustrated. In other arrangements (not illustrated), there may be more washers, such as two for the upper arm and another two for the lower arm of the rim 20a.

Figure 6:
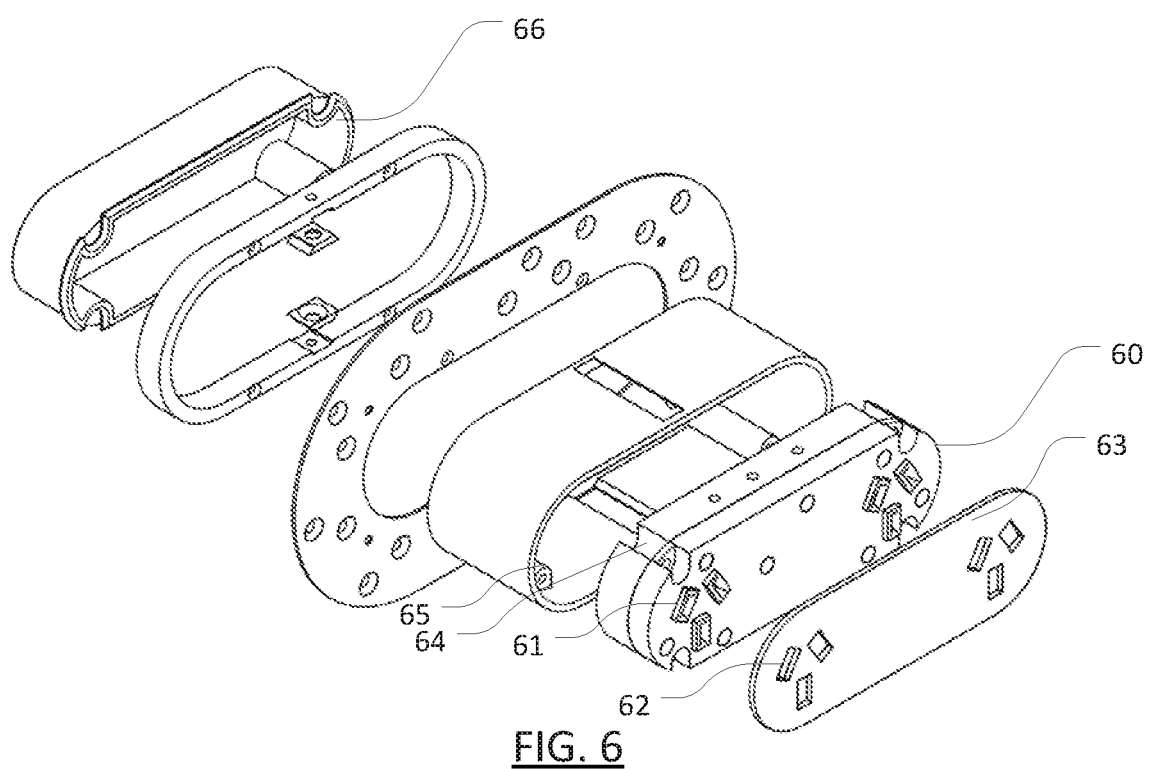
FIG. 6 is an exploded view of the adjustable mounting assembly shown in FIG. 1 and provided with a silicon box, an electrical receptacle and a faceplate.

To facilitate the movable engagement between the holder 14 and the mounting means 12, in the arrangement of FIG. 1, the holder 14 includes an outer engaging surface 16a shaped to correspond with a corresponding inner engaging surface 16b of the mounting means 12. The pair of corresponding engaging surfaces 16a and 16b are similar in cross-section (in size and/or shape) to allow the holder 14 and the mounting means 12 to slide over each other. For example, in this arrangement, the holder 14 and the mounting means 12 both have an oval-shaped cross-section, with the mounting means 12 having a slightly larger cross-sectional size to accommodate and receive the holder 14. Compared to a square or rectangular cross-section, the oval-shaped cross section provides a smoother and curved surface, instead of any sharp corners, to assist in a sliding motion between the holder 14 and the mounting means 12. Also, the oval shape avoids complex pre-installation drilling and cutout in a variety of surfaces. For example, an oval-shaped cutout may be achieved by performing cuts of two 50 mm holes (corresponding to a standard available electrical hole-saw size) and two straight cuts between the outsides of these holes. The required finished surface cutout can be quickly and simply completed in a variety of surfaces such as stone, tile, timber/wood and metal. Further, as illustrated in FIGS. 6 and 7, the two curved opposite ends of the oval shape correspond to two outermost electrical receptacles, and each has a semi-circle outline that is concentric at the respective receptacle. The two semi circles are designed to follow closely the shape of a male electrical plug 80 (see FIG. 8), cooperating with the flush finish of an installed mounting assembly to provide a minimalist appearance.

As mentioned above, in the arrangement of FIG. 1, the mounting means 12 includes an opening for receiving the holder 14. Upon receipt, the holder 14 may movably engage the mounting means 12. Where the mounting means 12 has been anchored in a wall, and where an electrical module has been received and held in the holder 14, the movable engagement between the holder 14 and the mounting means 12 facilitates adjustment of a position of the electrical module relative to the supporting surface. In turn, the adjustment of this relative position allows a flush finish of the electrical module with a range of wall thicknesses.

Figure 2A:
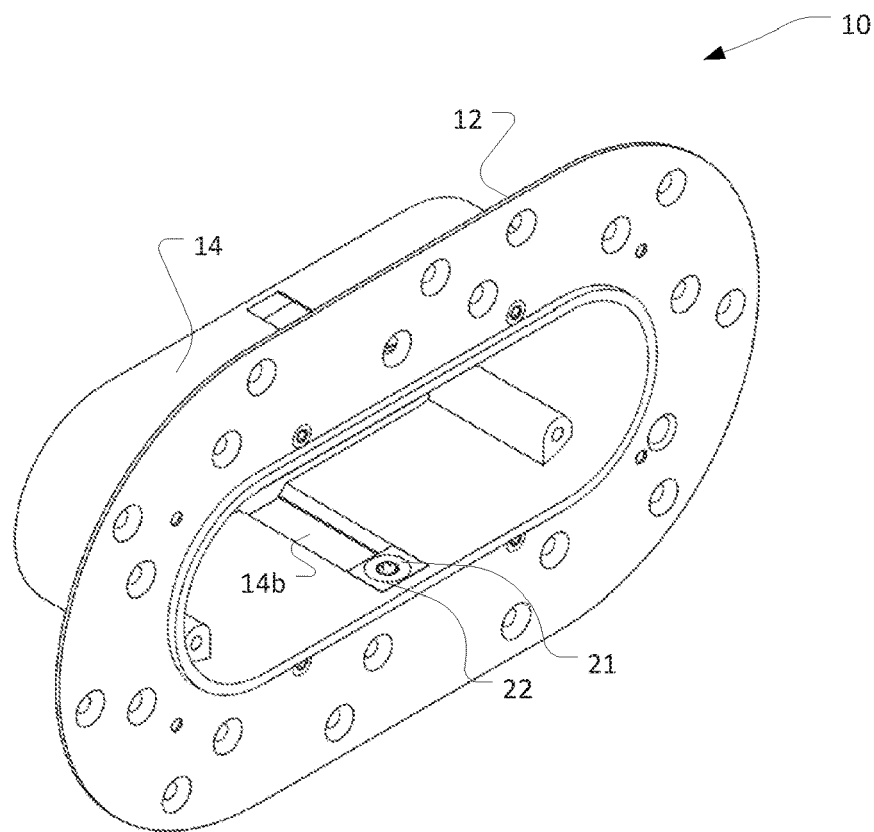
FIGS. 2A and 2B are front and back perspective views of the arrangement of the adjustable mounting assembly shown in FIG. 1 in an assembled form having a holder in a first position.
Figure 2B:
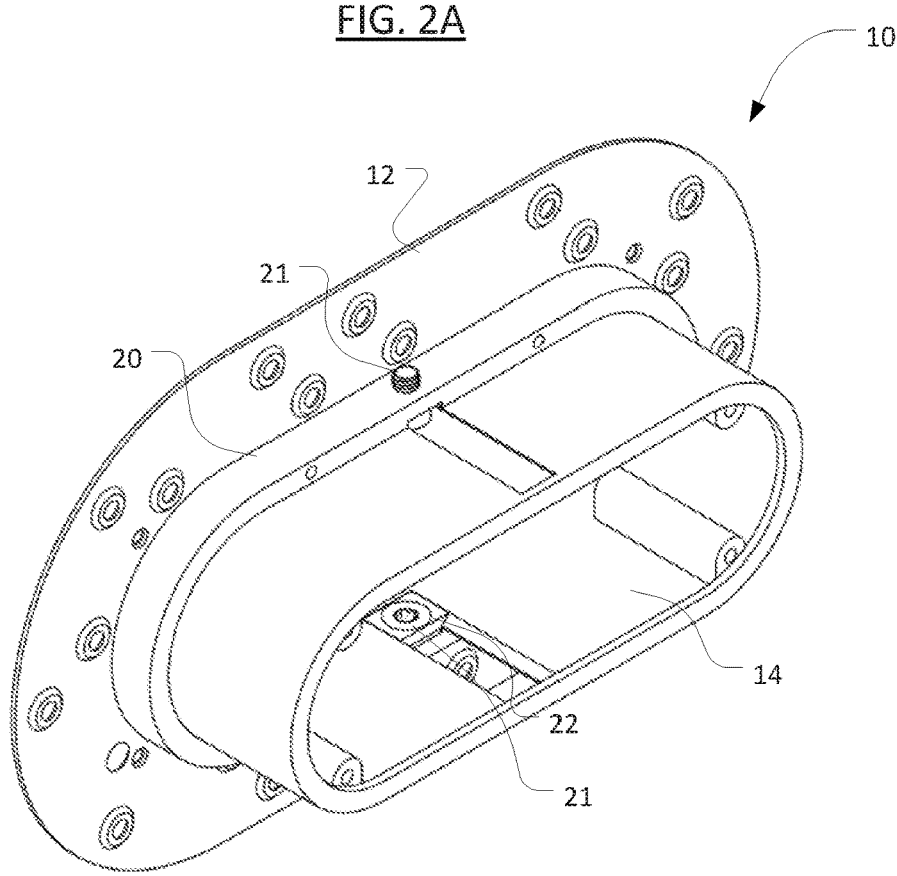
Figure 3A:
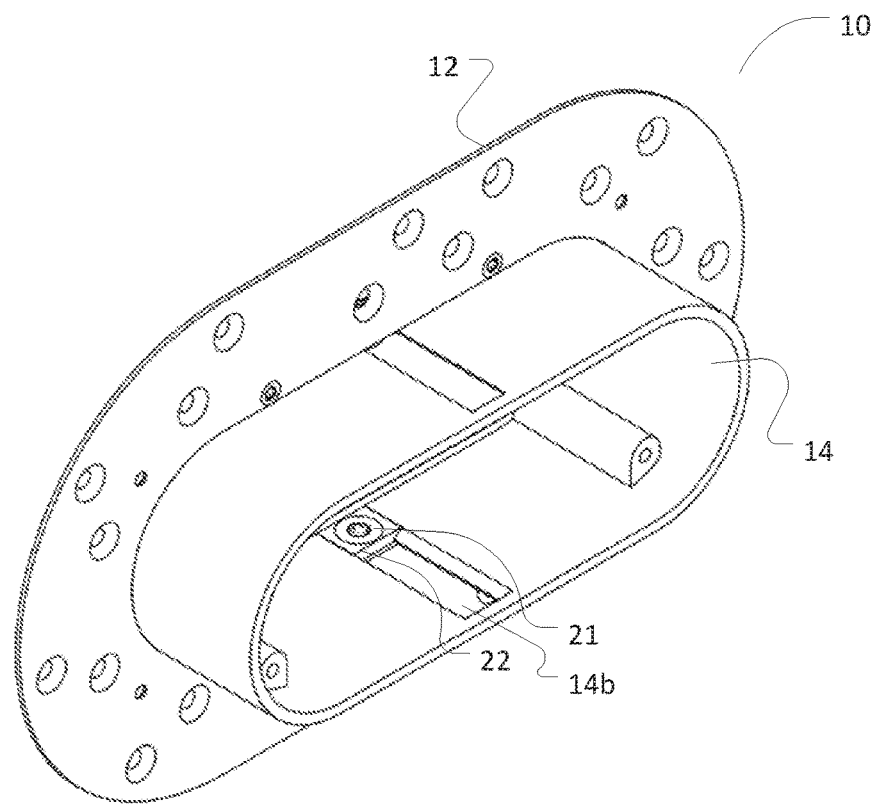
FIGS. 3A and 3B are front and back perspective views of the arrangement of the adjustable mounting assembly shown in FIG. 1 in an assembled form having the holder in a second position.
Figure 3B:
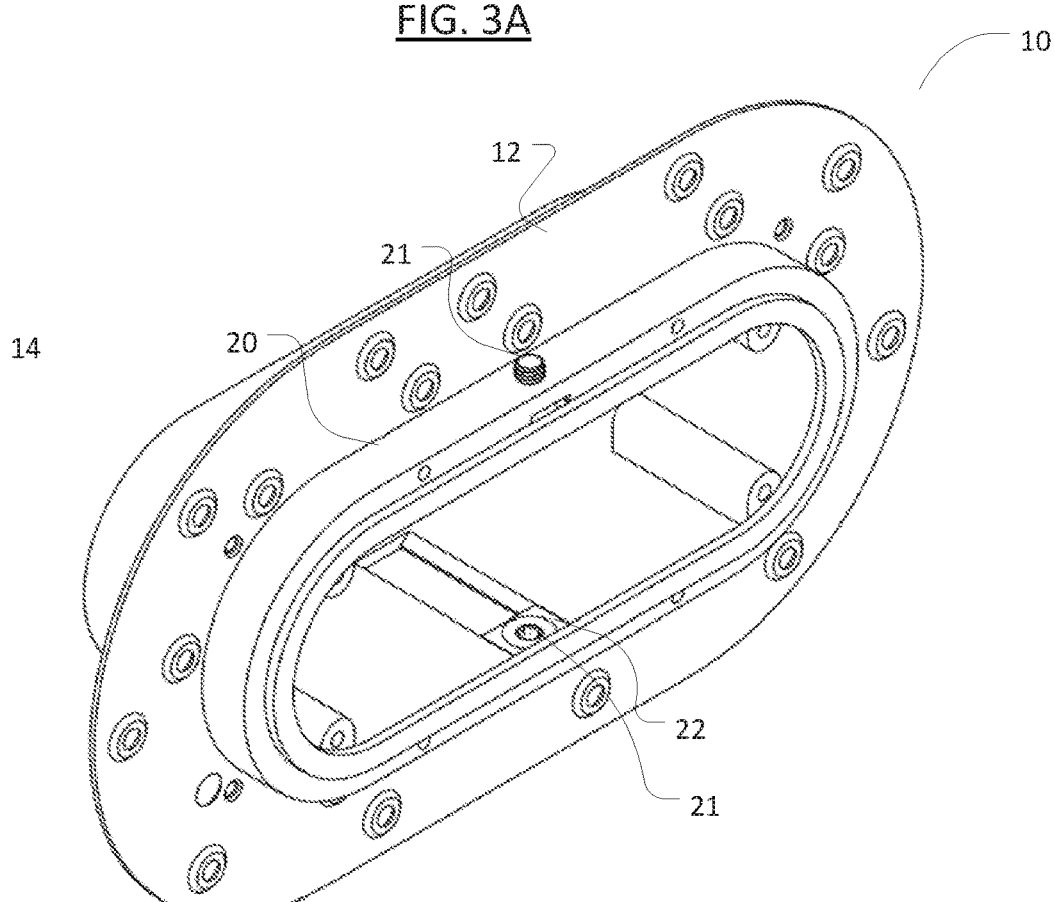

For example, FIGS. 2A and 2B show the holder 14 of the assembly 10 configured in one position (a first position), whereas FIGS. 3A and 3B show that holder 14 is configured in another position (a second position), The movable engagement allows the assembly 10 to be configured anywhere between the first and the second position. Positions towards the first position tend to accommodate smaller wall thicknesses, whereas positions towards the second position tend to accommodate larger wall thicknesses.

Figure 4A:
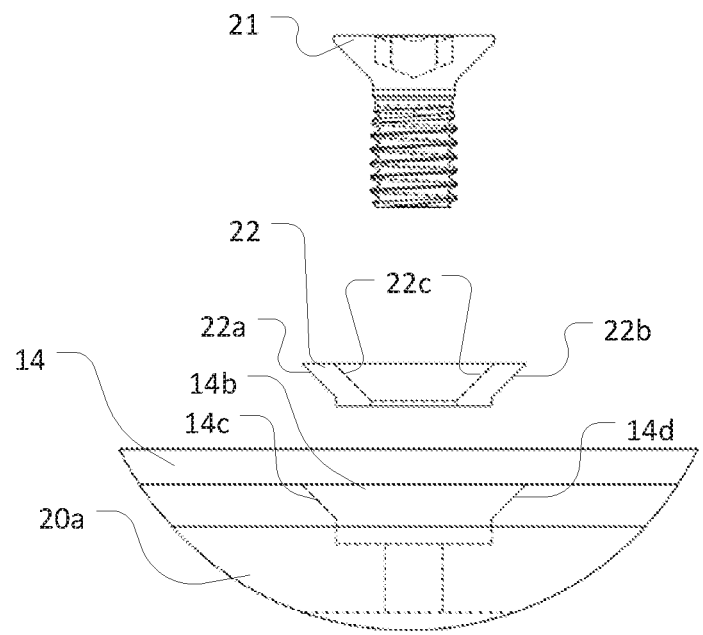
FIGS. 4A and 4B are a partial cross-sectional view and a partial perspective view of an example of fastening means of the adjustable mounting assembly shown in FIG. 1, wherein the fastening means is in an unfastened configuration.
Figure 4B:
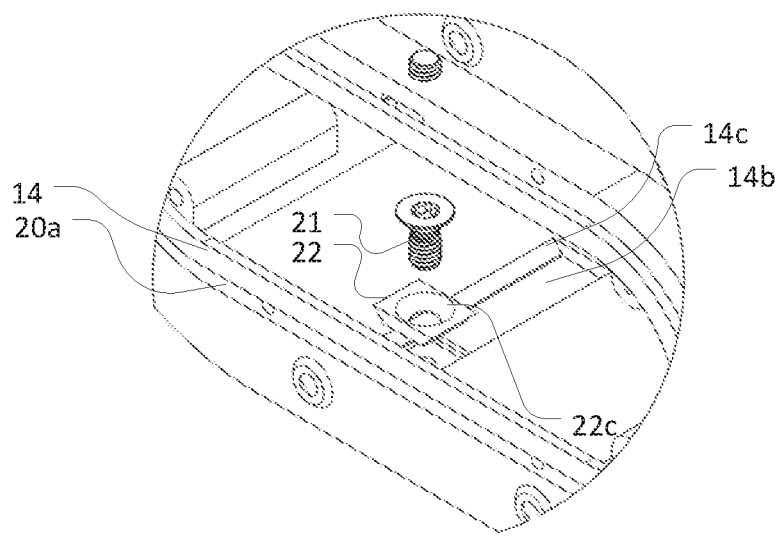
Figure 4C:
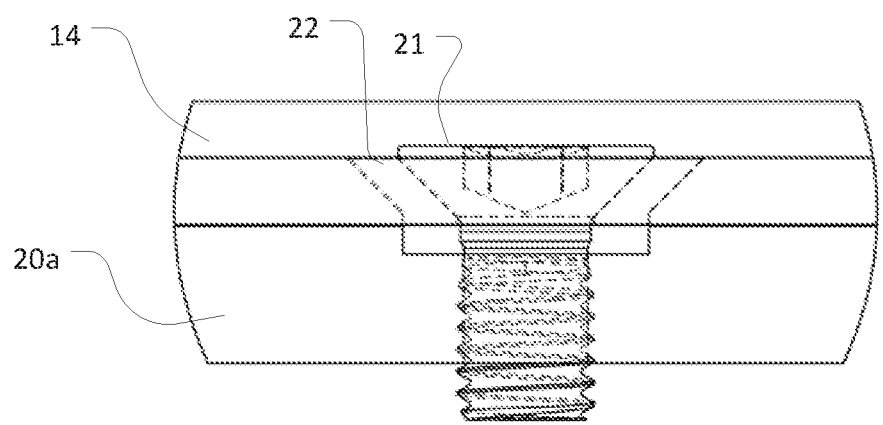
FIG. 4C is a partial cross-sectional view of the fastening means shown in FIGS. 4A and 4B, wherein the fastening means is in a substantially fastened configuration.

In the arrangement shown in FIG. 1, to fasten the holder 14 to the mounting means 12 once they are in a desired relative position, the one or more washers 22 and the rim 20a may be arranged to sandwich and press against the one or more tracks 14a and 14b of the holder 14 for securement via the one or more screws 21. FIGS. 4A to 4C illustrate an example of the fastening means 20 in an unfastened (FIGS. 4A and 4B) and a fastened configuration (FIG. 4C) in respect of the holder 14. In this example, the washer 22 takes a dovetail shape to accommodate the shape of the tracks 14b and the shape of the head of the screw 21. The washer 22 includes outer angled contacting surfaces 22a and 22b, and an inner angled contact surface (denoted by 22c). The outer angled contacting surfaces 22a and 22b are flat and shaped to correspond to two corresponding angled contacting surfaces 14c and 14d of the bottom track 14b which are also flat. The inner angled contact surface (denoted by 22c) is frustoconical and shaped to correspond to the screw head of the screw 21, which is also frustoconical.

Compared to an arrangement without the use of washer 22, the corresponding surfaces when pressed against each other (22a with 14c and 22b with 14d), for example, by tightening the screw 21 inserted through the washer 22 and the track 14b, allow a greater contact area for more evenly distributing a pressing force to fasten the holder 14 to the mounting means 12. Without the use of the washer 22, the curved frustoconical contacting surface of the screw head of screw 21 does not engage the flat surfaces of the track 14b as effectively as the arrangement using the washer 22. The screw 21 may be tightened by, for example, threaded engagement with a threaded screw hole (not shown) of the rim 20a or with a corresponding nut (not shown). Further, the corresponding surfaces (22a with 14c and 22b with 14d) allow relative movement, such as by sliding, between the holder 14 and the mounting means 12 while still keeping holder 14 and mounting means 12 partially bound to each other. Further still, the angled contacting surfaces 22a, 22b, 14c and 14d allow the screw 21 in a fastened configuration to be clear of the opening of the mounting means 12. The clearance in turn allows for more space to hold the electrical module.

Figure 5A:
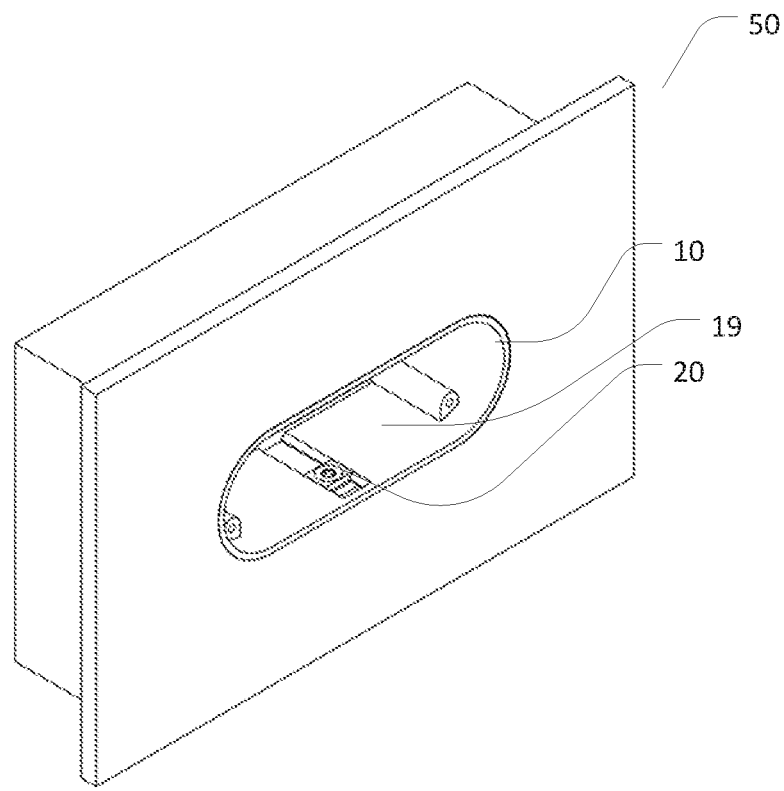
FIGS. 5A and 5B illustrate the arrangement of the adjustable mounting assembly shown in FIG. 1 installed to thinner and thicker walls, respectively.
Figure 5B:
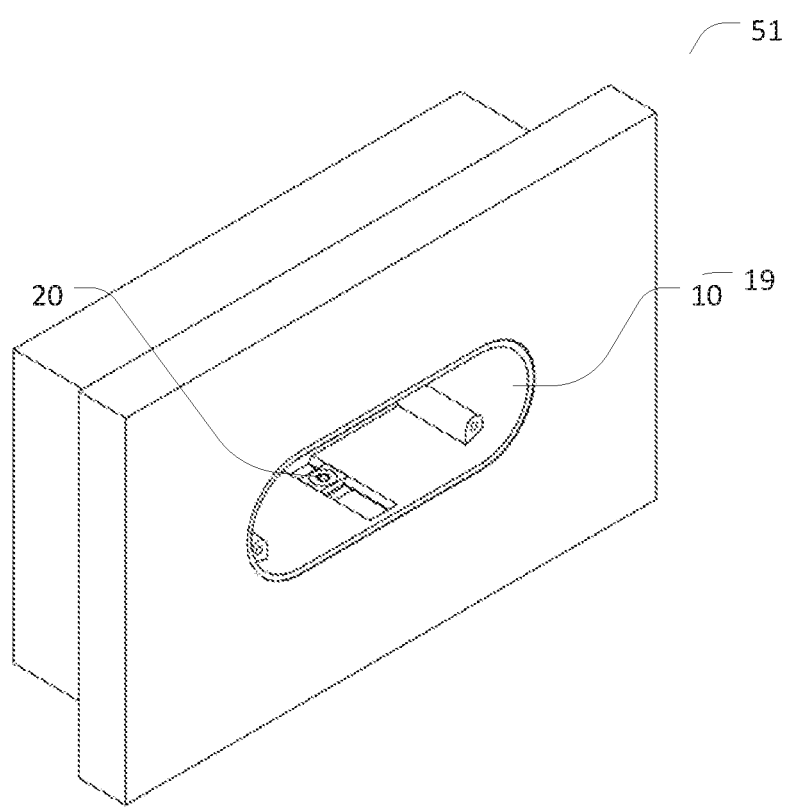

The fastening means 20 is accessible for unfastening and refastening via the aperture 19, allowing for re-adjustment of the position of the electrical module relative to the supporting surface. For example, FIGS. 5A and 5B illustrate the assembly 10 installed in thinner and thicker walls 50 and 51, respectively. In one scenario, FIG. 5A may represent an initial installation, whereas FIG. 5B represents a modified wall thickness, e.g. by additional rendering to the wall surface of FIG. 5A. In both FIGS. 5A and 5B, the fastening means 20 of the installed assembly 10 can be accessed via aperture 19, even after installation of the assembly 10. While only a portion of the wall (50 and 51) is shown, it should be appreciated that the wall (50 and 51) extends beyond the illustration of the figures and may fully enclose a room so that only the internal wall surface is visible or accessible. Accessing the fastening means 20 via the aperture 19 is therefore advantageous, since once the assembly is installed in a wall, it may be impossible to reach behind the wall for any re-adjustment. The access to the fastening means 20 via the aperture 19, which remains open (once the electrical module is removed) even when the assembly is installed in a wall, facilitates re-adjustment of the position of the electrical module relative to the supporting surface. This arrangement is therefore particularly useful for post-installation adjustment for a flush finish, for example, if due to another layer of rendering post-installation or other changes to the wall thickness.

In another arrangement, an assembly is provided with the holder 14 to hold an electrical module, but without the mounting means or the fastening means. In this arrangement, the holder 14 is directly inserted into a wall opening relative to a wall surface. The holder 14 is attached, epoxy-glued, or otherwise secured to the wall opening once a desired position of the holder 14 relative to the wall surface is reached. This arrangement is particularly useful for installing a trimless electrical outlet in a thick non-rendered solid stone wall or an already finished wall where rear access to the wall is limited or not optional, where some wall surfaces in their current conditions, such as in a heritage-listed building are required to be preserved as much as possible.

Figure 9:
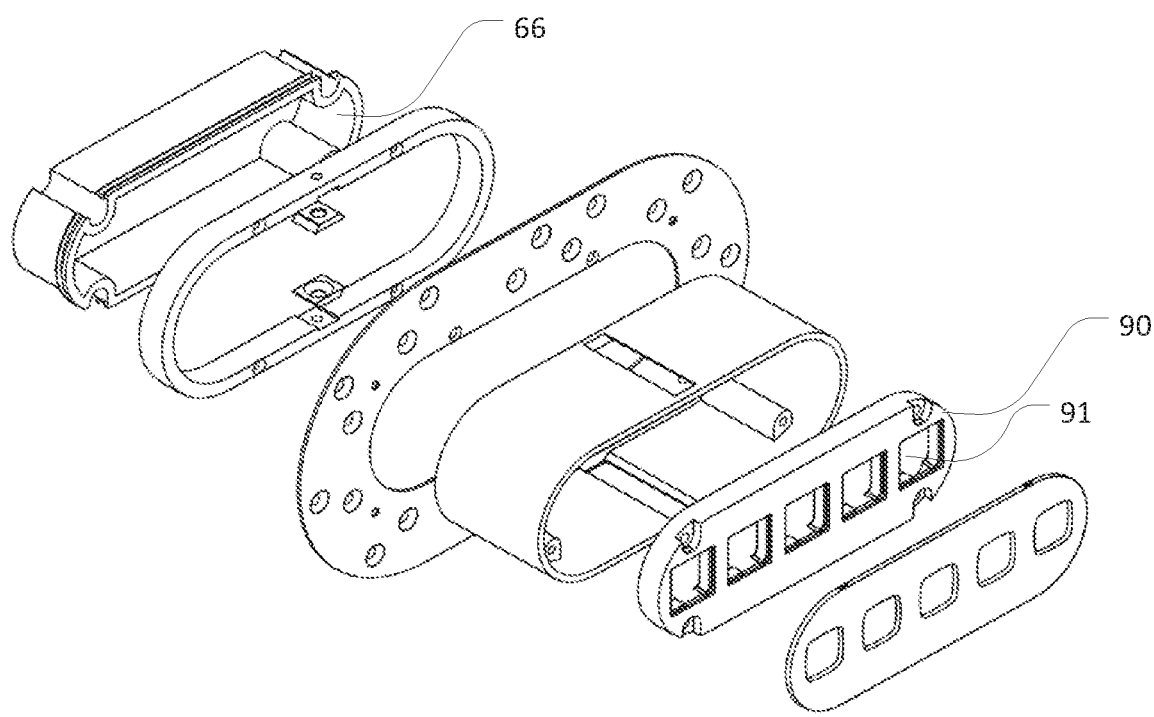
FIG. 9 is an exploded view of the adjustable mounting assembly shown in FIG. 1 and provided with a silicon cover, an electrical switch and a faceplate.

As shown in FIGS. 6 and 7 (both of which include substantially the same assembly as that shown in FIG. 1), in some arrangements where the electrical module is an electrical receptacle, the electrical receptacle includes an electrical cover 60 and 70 for covering the electrical receptacle that is being held within the holder 14. The electrical cover can have one or more pin receptors 61 and 71 shaped to receive an electrical plug or connector of an electrical appliance. In other arrangements, the electrical cover 90 can have one or more slots 91 shaped to receive an electrical switch assembly, as shown in FIG. 9 (which includes substantially the same assembly as that shown in FIG. 1). In yet another arrangement (not shown), the slots 91 may be shaped to receive data or switch mechanism, such as a data connecting device, via a universal serial bus (USB)

In other arrangements, the holder 14 may hold a distribution box and/or other electrical DC or AC outlets.

The disclosed assembly may include a faceplate 63 for the electrical module. For example, as shown in FIG. 6, the pin receptors 61 shaped to receive an electrical plug or connector protrude above the surrounding surface of the electrical cover 60 to engage corresponding cut-outs 62 of the faceplate. Furthermore, as seen in FIG. 6, the electrical cover 60 comprises one or more guiding channels 64, each terminating at a recess within the guiding channel, so that the recesses are adapted to abut against four guides 65 located within the holder 14. The electrical cover 60 may be affixed to the holder 14 through, for example, fasteners extending through the recess into the guides 65 and resides at a depth lower than the holder 14 for the insertion of a faceplate 63.

The faceplate 63 can cover the electrical cover 60 and any fasteners for the guides 65 in order to obtain a flush finish with the wall surface. In some arrangements, the faceplate 63 comprises a similar material, such as plaster, wood, metal, marble or the like, as the supporting surface. In some arrangements, the faceplate 63 is interchangeable and may be useful if the surface surrounding the adjustable mounting assembly is changed.

The faceplate 63 may be adapted to magnetically attach to the electrical module. For example, the electrical cover 60 and faceplate 63 may contain magnetic material, such as one or more magnets.

As can also be seen from FIGS. 6, 7, 8 and 9, the adjustable mounting assembly may include a back cover in the form of an open-ended box 66 or a flat cover 76 for covering an exposed side of the aperture 19 of the holder 14. The back cover may be made of silicon, or other material. The back cover is designed to cover a back side of the holder 14 to stop debris or dust from entering the aperture of the holder 14. In some arrangements, the back cover may be puncturable to form one or more openings for the passage of one or more electrical wires. Alternatively or additionally, the body of the holder 14 may be puncturable to form openings, such as circular openings. To aid the puncturing, for example, a substantial but not complete length of the perimeter of each opening may be partially pre-cut to facilitate removal of a portion of the holder 14. In one arrangement, four arcs along a circular opening have been pre-cut, leaving four short connections in between consecutive arcs to hold the removal part. A user needs only break the short connections to remove the removal part to expose the opening, through which electrical wires or cables may pass.

It will be appreciated that the mounting means and holder can be of any shape, for example, a square or rectangle and that multiple openings for the insertion of one or more holders may be located anywhere within the mounting means.

Figure 10A:
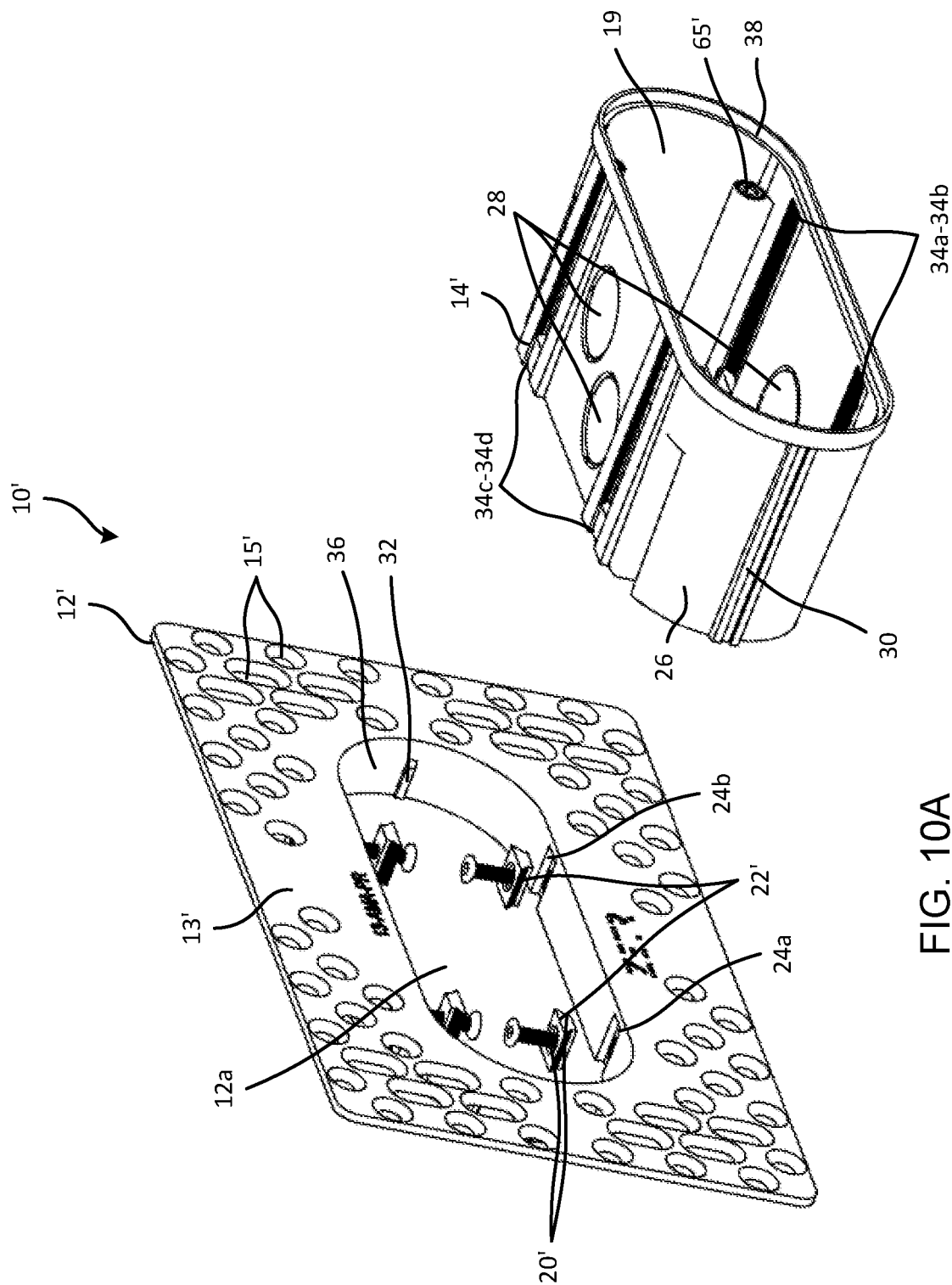
FIG. 10A illustrates an exploded view of a second arrangement of an adjustable mounting assembly in an unassembled form.

FIGS. 10A-20 show further arrangements of an adjustable mounting assembly 10' for mounting an electrical module relative to a supporting surface. The same reference numerals are adopted for like components in the arrangements of FIGS. 10A to 20. FIG. 10A illustrates an assembly 10' in an unassembled form, while FIGS. 10B-10C and FIGS. 11A-11C illustrate an assembly 10' in an assembled form.

The assembly 10' comprises a mounting means 12', a holder 14' and a fastening means 20'. The mounting means 12' includes a substantially flat portion 13' that is adapted for anchorage relative to a supporting surface. In one example, mounting means 12' can be embedded relative to the supporting surface by plastering over the rectangular shaped flat portion 13'. In some instances, this embedment may be sufficient to anchor the mounting means 13' to the supporting surface. In another example, the mounting means 12' can be anchored relative to the supporting surface before plaster is applied by inserting one or more in-wall anchors through one or more anchoring holes 15' located within the rectangular shaped flat portion 13'. As shown in FIGS. 10 to 13, the mounting means 12' may be rectangular in shape. In alternative embodiments other shapes may be adopted. Embodiments with a flat portion 13' facilitate installations in which the assembly 10' is flush or substantially flush with a supporting surface. Where one or more protrusions from the supporting surface is desired, for example to achieve a particular aesthetic appearance around the electrical connectors, then the one or more protrusions may be provided on the mounting means 12', for example integral with the mounting means 12'. The supporting surface may be a surface of any supporting structure. For example, the supporting structure may be an internal building structure, such as a wall, a floor or a ceiling. As another example, the supporting structure may be a non-building-related structure or aesthetic finish, such as a joinery surface, a wardrobe surface, an island bench surface or a furniture surface. In one example, the furniture surface may be a bed head, table or desk surface.

The mounting means 12' includes a support 36, which defines an opening 12a that is adapted to receive the holder 14'. In some embodiments the support 36 is an integral part of the mounting means 12'. The support 36 includes a projection or flange that extends substantially transverse to the flat portion 13', whereby when the mounting means 12' is anchored to a front or outer surface of the substrate forming the support surface, the support 36 extends into a substrate of the support surface and when the mounting means 12' is anchored to a back or inner surface of the substrate forming support surface the support 36 may extend either out the back of the substrate or into the substrate. In some embodiments the support extends transverse to the flat portion 13' to an extent approximately the same as the depth of a substrate to which the mounting means 12' is anchored. In the arrangement shown in FIGS. 11B-11C one or more wedges 37 are provided on an exterior surface of the flange of the support 36 to engage the substrate of the supporting surface. The holder 14' includes a sidewall 26 connected to a rearwall 42 whereby the sidewall 26 defines an aperture 19 for receiving and holding an electrical module (not shown). As shown in FIG. 10, the sidewall 26 and/or rearwall 42 of the holder 14' can include one or more puncturable openings 28 to form one or more openings for the passage of one or more electrical wires. In order to assist puncturing of these openings and subsequent removal of a portion of the sidewall 26 and/or rearwall 42 of the holder 14', a substantial but not complete length of the perimeter of each puncturable opening 28 is partially pre-cut or includes lines of weakening.

Figure 10B:
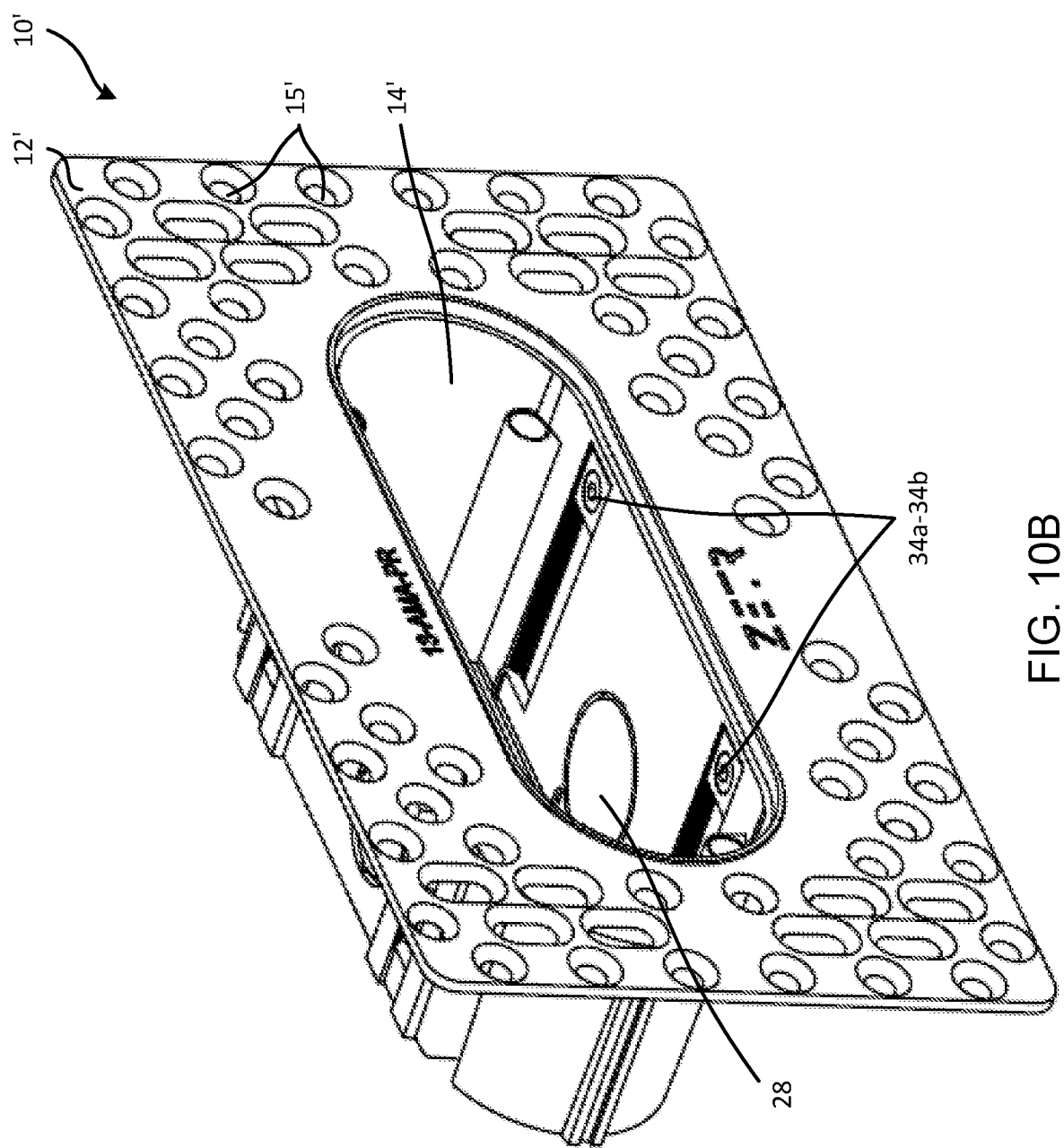
FIGS. 10B-10C illustrate front perspective views of the second arrangement of the adjustable mounting assembly of FIG. 10A in an assembled form and in a first position and second position, respectively.
Figure 10C:
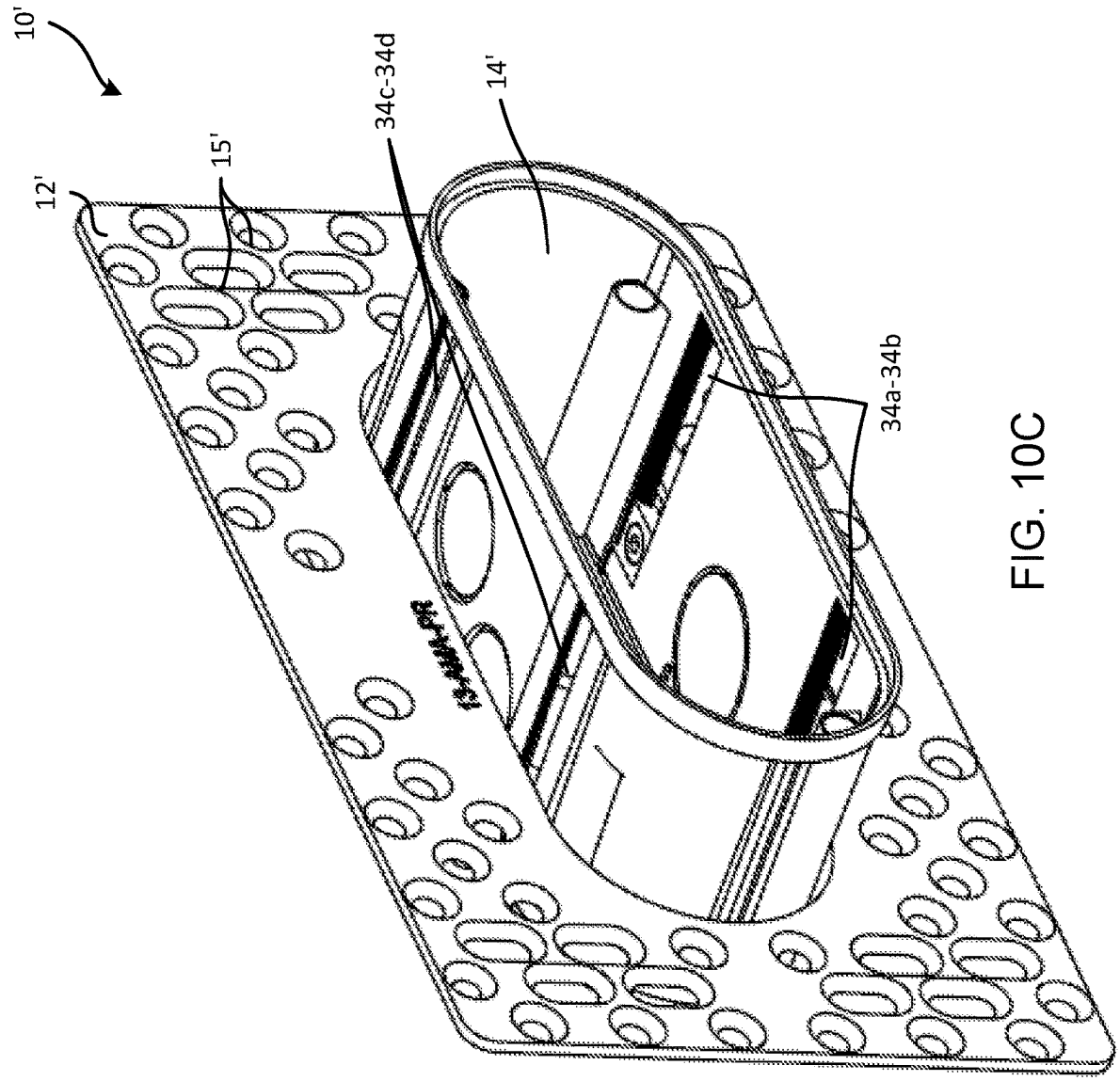
Figure 11B:
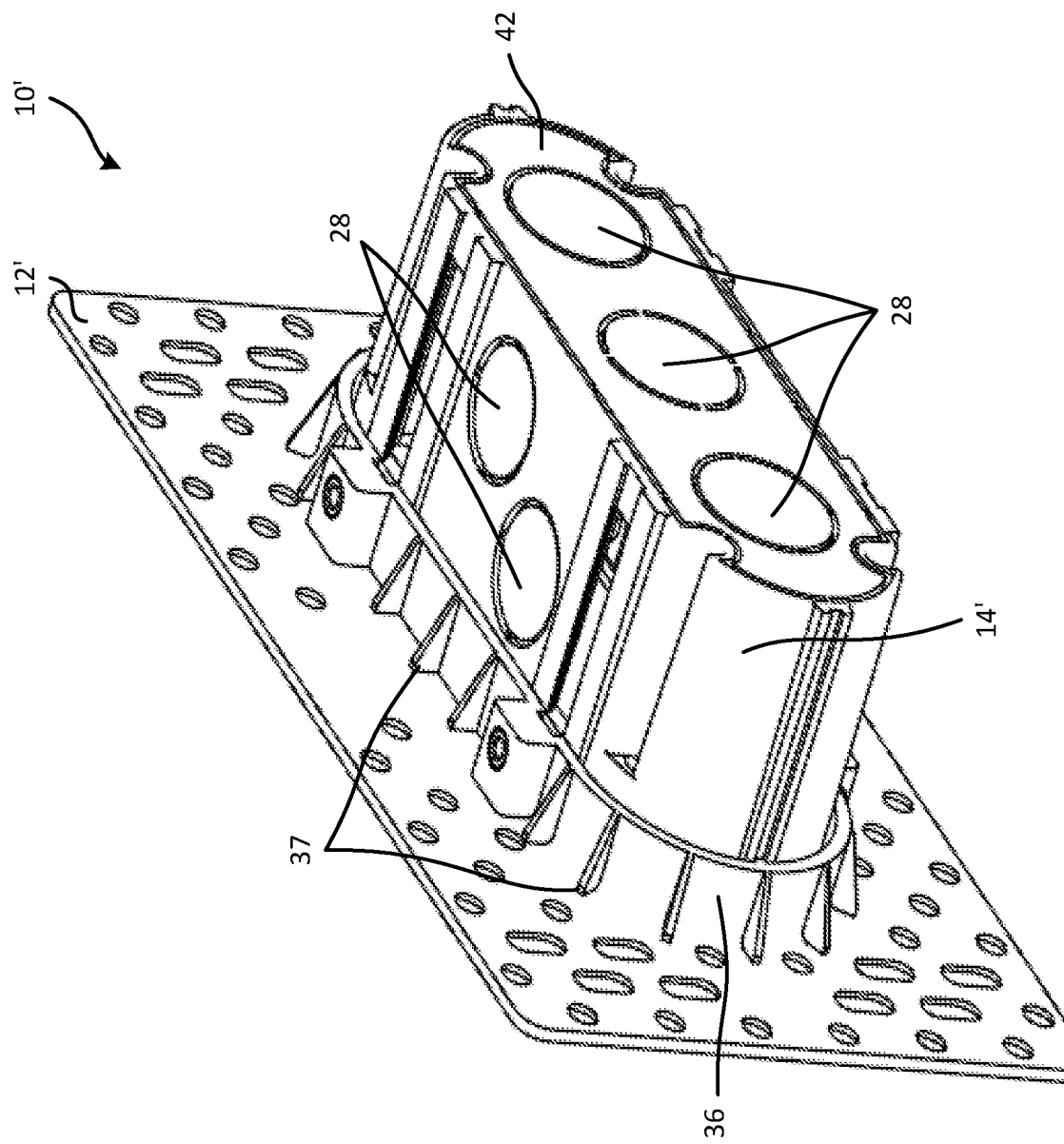
FIG. 11B-11C illustrate back perspective views of the second arrangement of the adjustable mounting assembly of FIGS. 10A-10C and 11A in a first position and a second position, respectively.
Figure 11C:
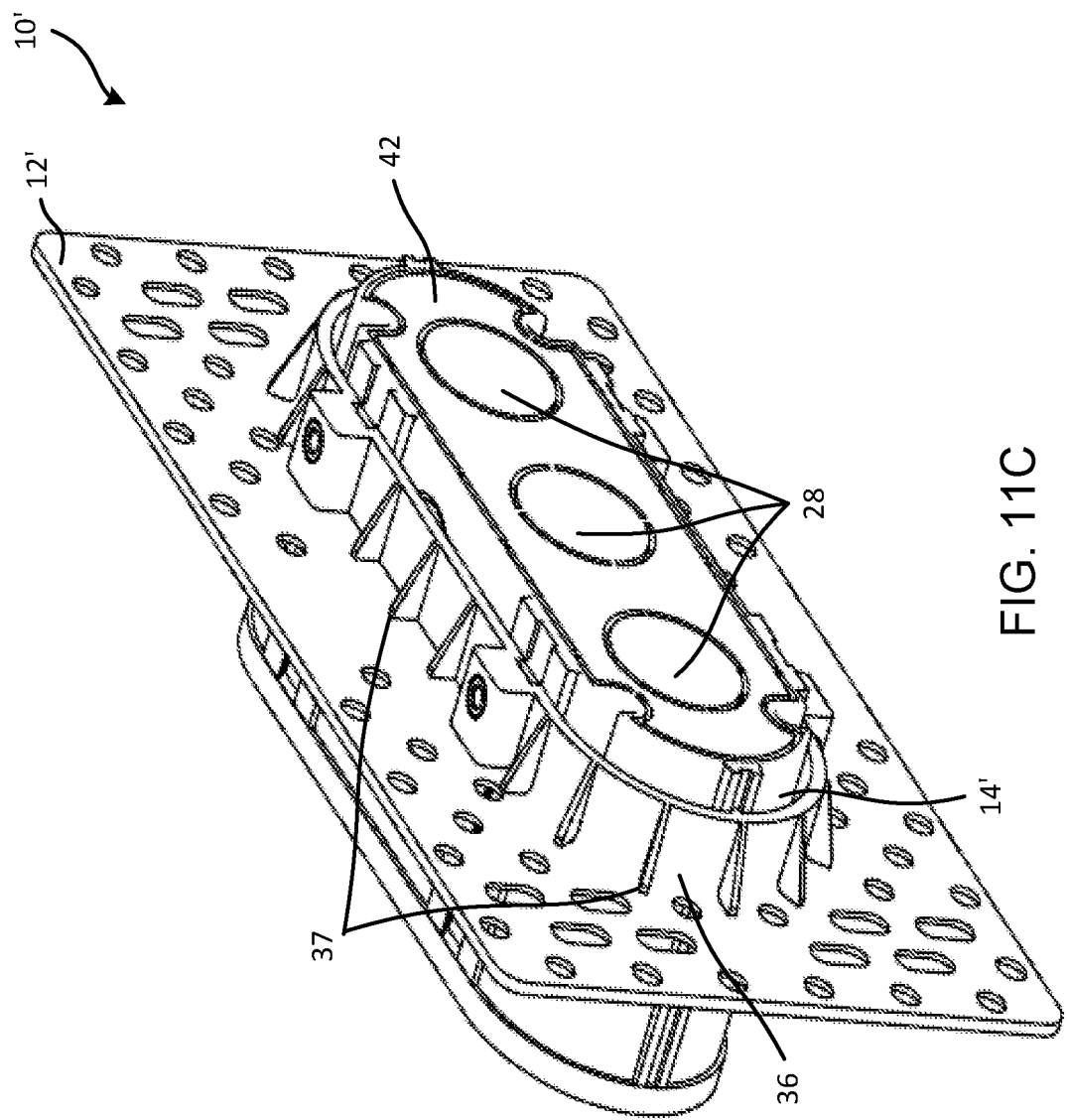

The holder 14' is adapted for moveable engagement with the mounting means 12'. The movable engagement facilitates adjustment of a relative position between the holder 14' and the mounting means 12', thereby facilitating adjustment of a position of the electrical module relative to the supporting surface. Such adjustment allows the assembly 10' to be used to achieve a flush finish for a range of wall thicknesses. For example, FIG. 10B shows the holder 14' of the assembly 10' configured in one position (a first position), whereas FIG. 10C shows that holder 14' is configured in another position (a second position), In another example, FIG. 11B shows the holder 14' of the assembly 10' configured in one position (a first position), whereas FIG. 11C shows that holder 14' is configured in another position (a second position).

To facilitate the movable engagement between the holder 14' and the mounting means 12', in the arrangement of FIG. 10A-11C, the sidewall 26 of holder 14' is shaped to correspond with the corresponding support 36 of the mounting means 12'. The sidewall 26 and support 36 are similar in cross-section (in size and/or shape) to allow the holder 14' and the mounting means 12' to slide relative to each other. For example, in this arrangement, the holder 14' and the support 36 both have an oval-shaped cross-section, with the support 36 having a slightly larger cross-sectional size to accommodate and receive the holder 14'. In alternative embodiments other shapes may be adopted, for example, a circular-shaped cross section of the holder 14' and support 36.

Compared to a square or rectangular cross-section, an oval-shaped or circular-shaped cross section provides a smoother and curved surface, instead of any sharp corners, to assist in a sliding motion between the holder 14' and the mounting means 12'. Also, the oval or circular shape avoids complex pre-installation drilling and cutout in a variety of surfaces. For example, an oval-shaped cutout may be achieved by performing cuts of two 48 mm holes (corresponding to a standard available electrical hole-saw size) and two straight cuts between the outsides of these holes. The holder 14' can further include one or more grooves 30 located on an exterior surface of the sidewall 26 for engaging one or more corresponding tongues 32 of support 36 to assist sliding of holder 14' with respect to the mounting means 12'. Holder 14' may also engage fastening means 20' via one or more tracks 34a-34d provided within the sidewall 26 of holder 14". As shown by example in FIGS. 10-11, the holder 14' is provided with a total of four tracks 34a-34d for engaging four washers 22', whereby two tracks 34a-34b are provided on a lowermost portion of the holder 14' and two tracks are provided on an uppermost portion of holder 14'. In another arrangement, the holder 14' is provided with a total of two tracks 34a-34b for engaging two washers 22, whereby one track 34a is provided on a lowermost portion of the holder 14' and another track is provided on an uppermost portion of holder 14'.

Fastening means 20' is adapted for fastening the holder 14' to the mounting means 12', for example, once a desired relative position of the electrical module relative to the supporting surface has been reached. In the arrangement shown in FIGS. 10-11, the fastening means 20' includes one or more screws 21 and one or more washers 22'

The support 36 of mounting means 12' further includes one or more tracks 24a-24d for engaging one or more washers 22'. Each of these tracks 24a-24d may further be provided with threaded screw holes (not shown) for engaging screws 21 inserted through washers 22'. In the arrangement shown in FIGS. 10-11, the support 36 of the mounting means 12' is provided with four tracks 24a-24d, whereby two tracks 24a-24b are provided on an uppermost portion of holder 14'. In another arrangement, the support 36 of the mounting means 12' is provided with two tracks 24a-24b, whereby one track 24a is provided on a lowermost portion of the holder 14' and another track is provided on an uppermost portion of holder 14'.

Figure 12:
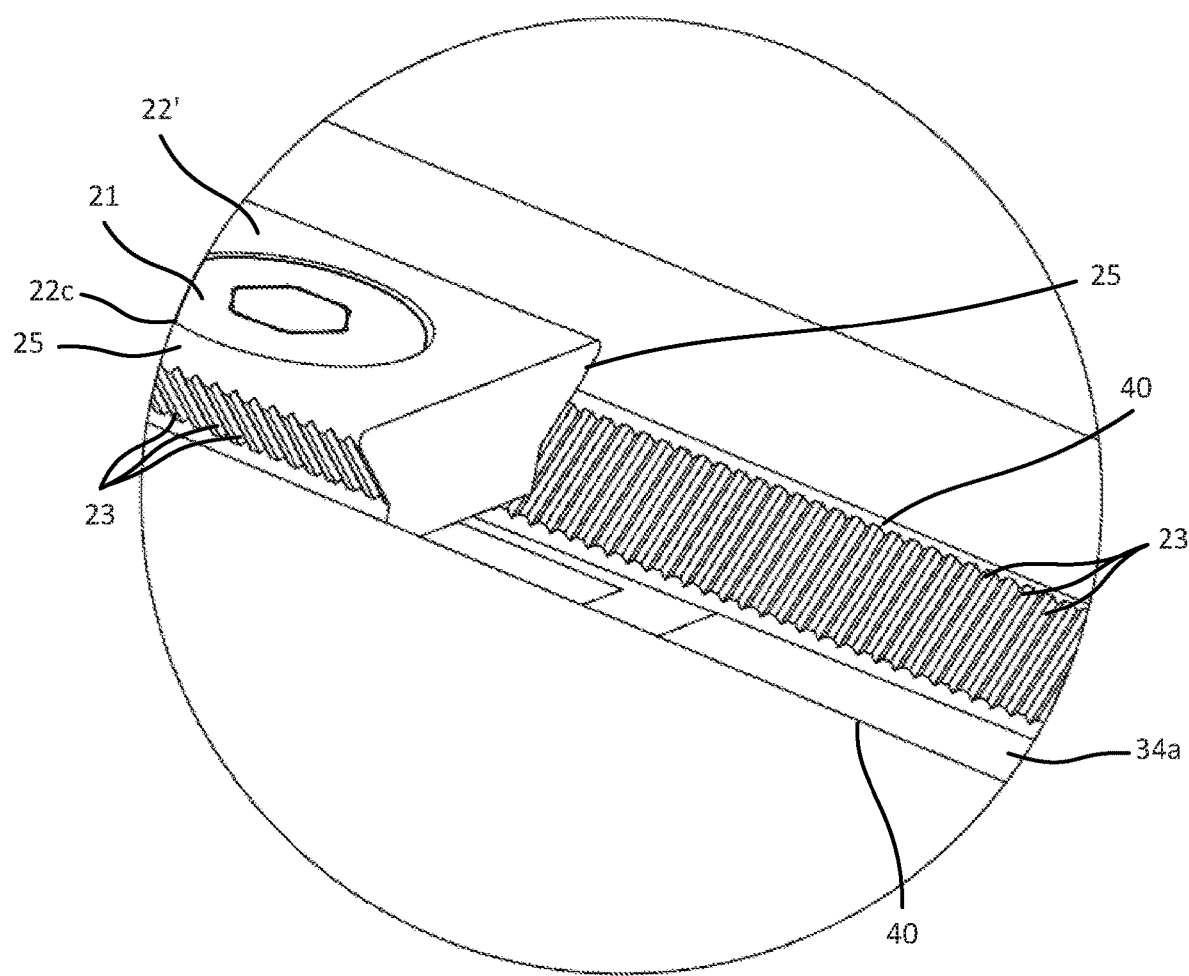
FIG. 12 illustrates a partial perspective view of another example of a fastening means of the adjustable mounting assembly shown in FIGS. 10A-11C, wherein the fastening means is in an unfastened configuration.
Figure 13:
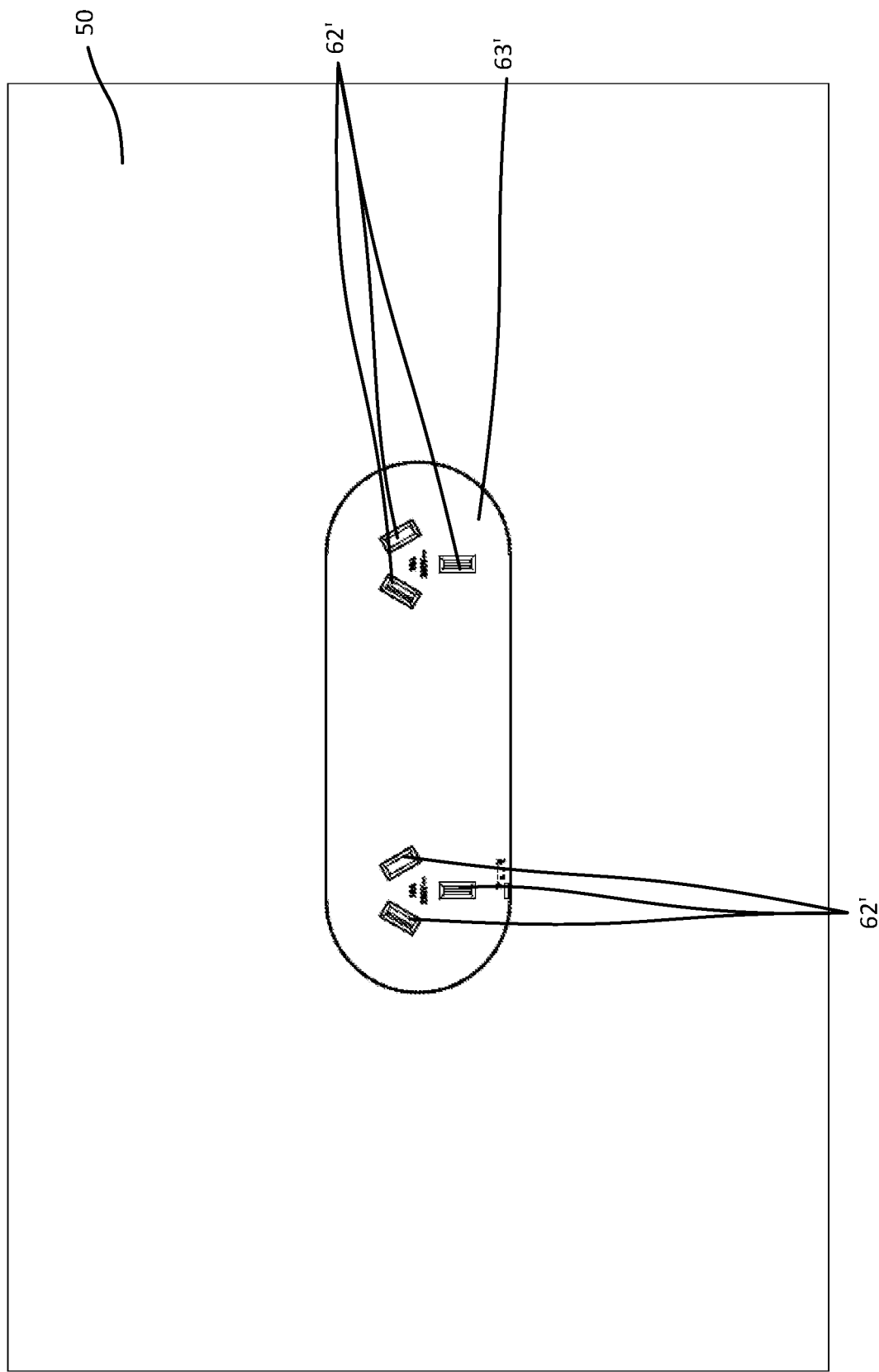
FIG. 13 illustrates a front view of a faceplate for use with an adjustable mounting assembly shown in FIGS. 1-12 within a supporting surface.
Figure 14:
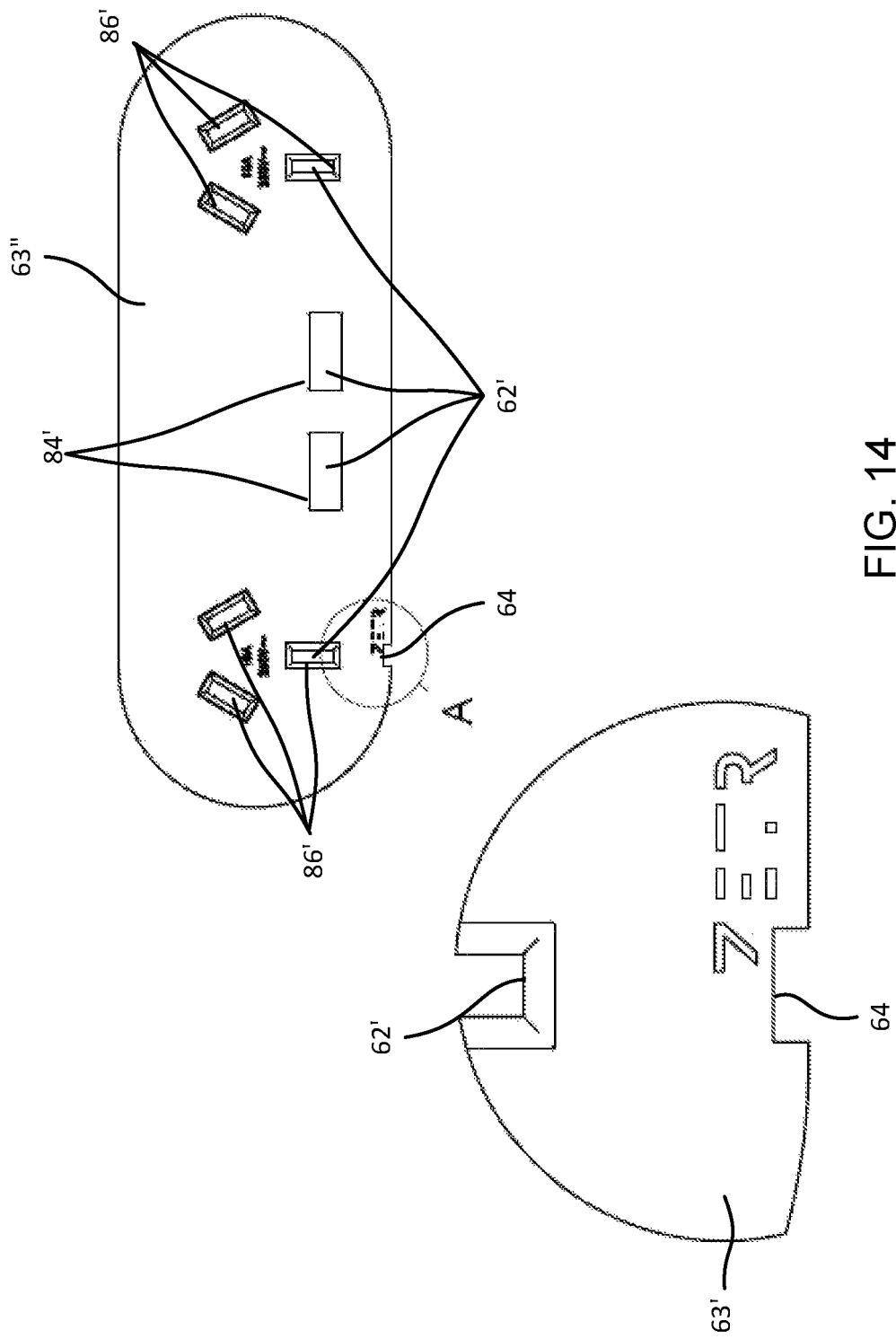
FIG. 14 is a front view of the faceplate shown in FIG. 13.

In the arrangement shown in FIGS. 10-12, the washer 22' takes a dovetail shape to accommodate the shape of the tracks 34a-34d of the holder 14' and the shape of the tracks 24a-24d of the support 36. Each washer 22' is provided with outer angled contacting surfaces 25 and an inner angled contacting surface 22c. The outer angled contacting surfaces 25 of each washer 22' engage corresponding inner angled contacting surfaces 40 of each track 34a-34d of holder 14'. The inner angled contacting surface 22c of each washer 22' is frustoconical and shaped to correspond to the screw head of the screw 21, which is also frustoconical.

As shown in FIG. 11, to fasten the holder 14' to the fastening means 20' once the holder 14' is in a desired relative position to the mounting means 12', the one or more washers 22' may be arranged to sandwich and press against the one or more tracks 34a-34d of the holder 14' and the one or more tracks 24a-24d of support 36' for securement via the one or more screws 21. Tracks 24a-24d of rim 20a and tracks 34a-34d of holder 14' may permit screws 21 in a fastened configuration to be clear of the opening 12a of the mounting means 12' and to provide more clearance for storage of the electrical module.

In one example, the materials of the holder 14', mounting means 12' and/or the washers 22' may be selected from one of plastic, polycarbonate or metal such as cast steel or aluminum to provide increased friction between the inner angled contacting edges 40 of the tracks 34a-34d and the outer angled contacting surfaces 25 of the washers 22' during adjustment of holder 14' with respect to the mounting means 12'. In order to provide additional friction during adjustment of the holder 14' with respect to the mounting means 12', one or more serrations 23 may be provided on one or more inner angled contacting edges 40 of each track 34*a*-34*d* and/or one or more corresponding outer angled contacting surfaces 25 of washer 22'. In one example shown in FIG. 12, a plurality of serrations 23 are provided on the inner angled contacting edges 40 of track 34*a* to frictionally engage the serrated outer contacting surfaces 25 of washer 22'. These serrations 23 may also assist in accommodating the mechanical load of the electrical cover 60 and faceplate 63' when the mounting assembly 10' is in a fastened configuration and installed into a supporting surface 50, as shown by example in FIG. 13. In the arrangements shown in FIGS. 15-17 and 19-20 faceplate 63'-63''' are dimensioned to be larger than electrical covers 60'-60" and 90' (corresponding to electrical cover 60 and 90 described herein) and has an angled edge 66 located on its rear surface 68 for engaging a groove 38 of the holder 14' (see FIG. 10) in order to obtain a flush finish with the supporting surface 50.

In one arrangement, the faceplate 63' or 63" includes one or more cut-outs 62' for engaging one or more protruding receptors 61' of the electrical cover 60' or 60". In the arrangement shown in FIGS. 14-15 and 18-19, these cut-outs 62' are shaped as an electrical plug or receptor cut-outs 86' for receiving an electrical plug and/or outlet cover 92. In the arrangement shown in FIGS. 14-15 and 19, these cut-outs 62' may also be shaped as a data mechanism, such as a universal serial bus 84. In another arrangement, the electrical cover 90' and faceplate 63''' can have one or more slots 91' shaped to receive an electrical switch assembly, as shown in FIG. 20.

In the arrangements shown in FIGS. 14 and 18-20, the faceplate 63'-63''' further comprises an aperture 64 configured to receive a tool for removing the faceplate 63'-63''' from the electrical cover 60'-60" or 90' when installed into a supporting surface 50, for example, to gain access to the electrical cover. In some cases, the force applied to remove the faceplate 63'-63''' via aperture 64 is enough to remove both the faceplate 63'-63''' and electrical cover 60'-60" or 90' from the mounting assembly 10' when installed into a supporting surface 50. In yet another arrangement, the aperture 64 extends through the faceplate 63'-63''' and the electrical cover 60'-60" or 90' to receive a tool for removing the faceplate 63'-63''' and electrical cover 60'-60" or 90' from the mounting assembly 10'.

Figure 15:
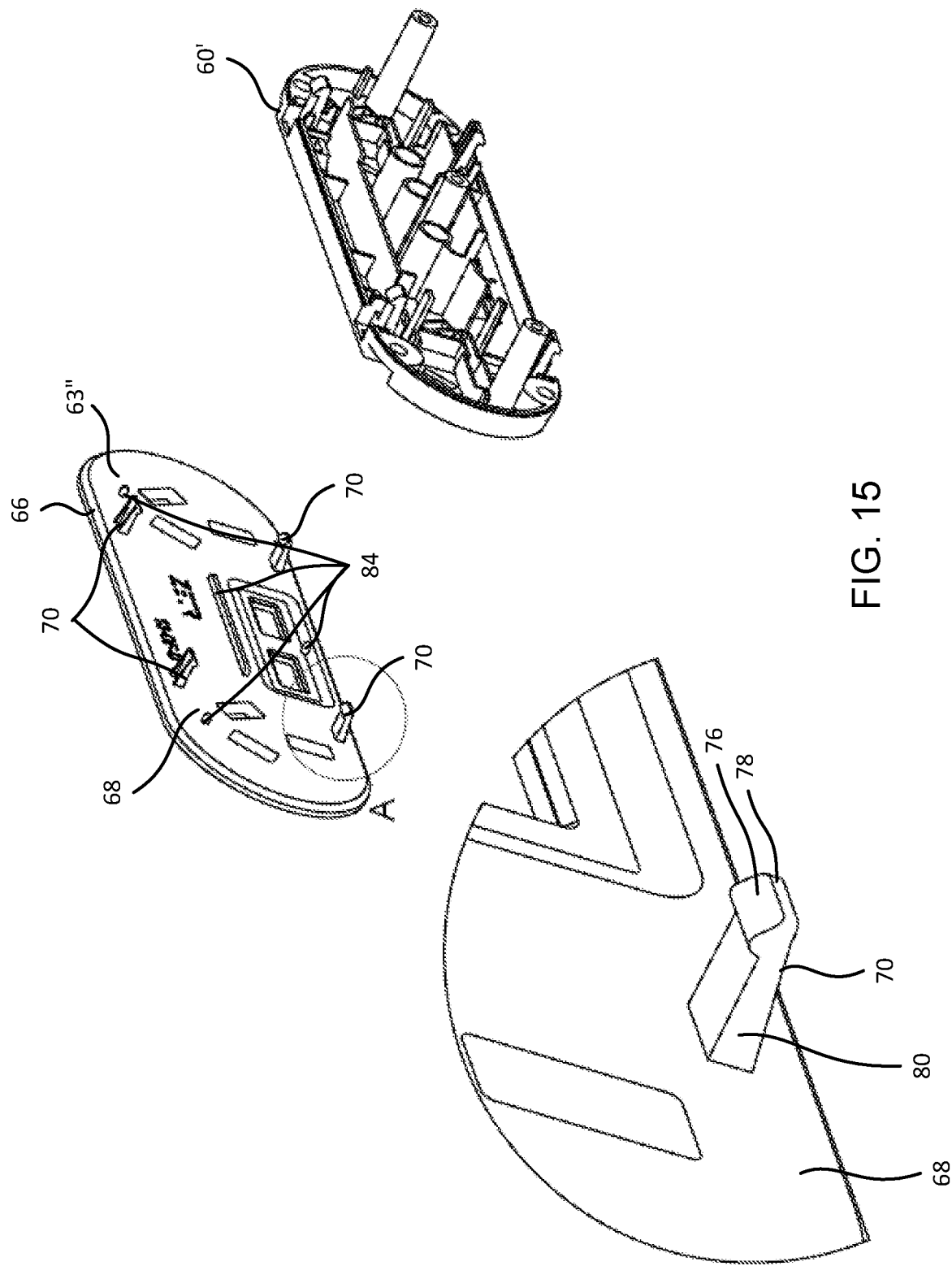
FIG. 15 is an exploded view of the faceplate shown in FIGS. 13-14 and an electrical receptacle.
Figure 16:
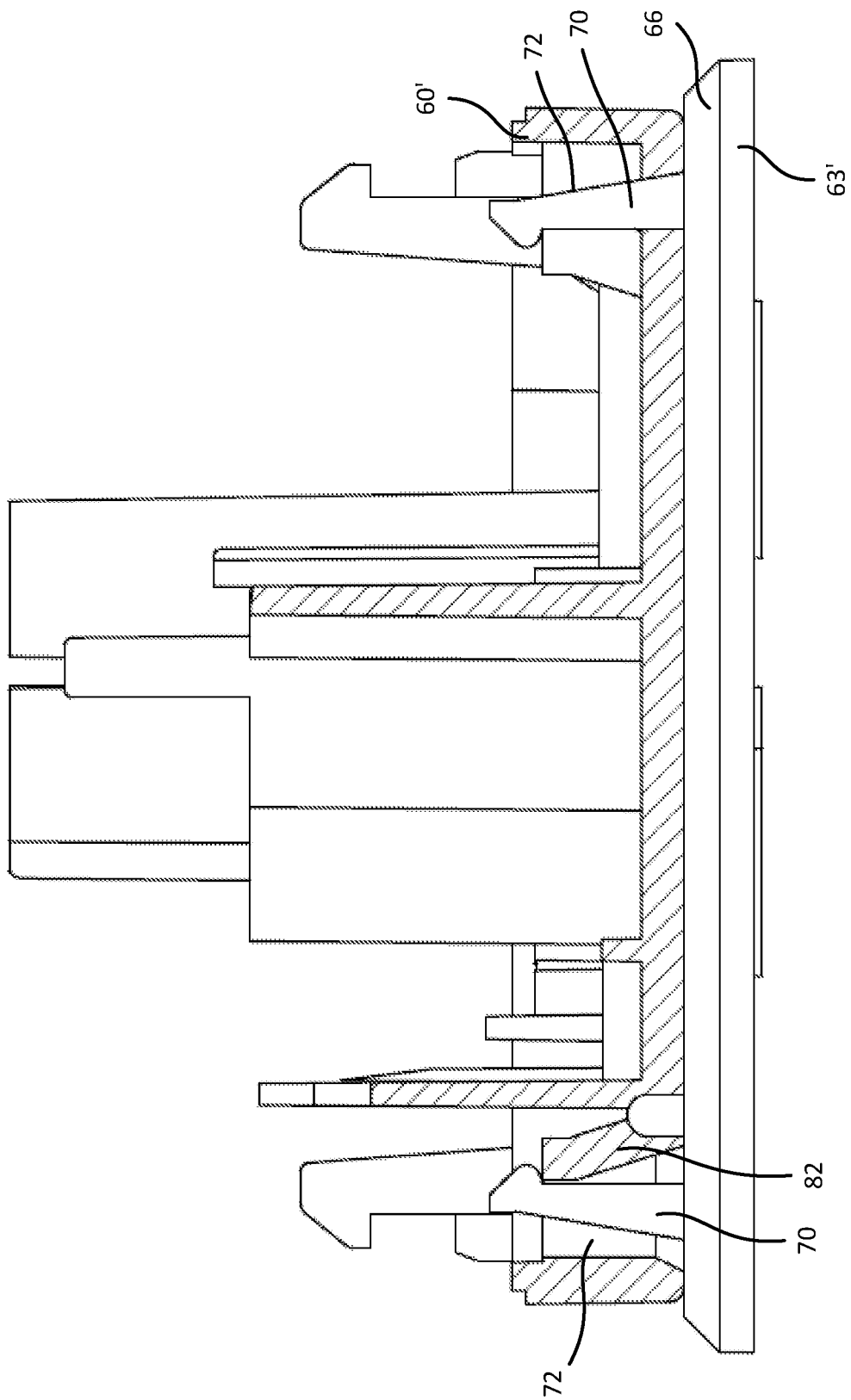
FIG. 16 is a side view of the faceplate and electrical receptacle of FIG. 15 in a locked configuration.
Figure 17:
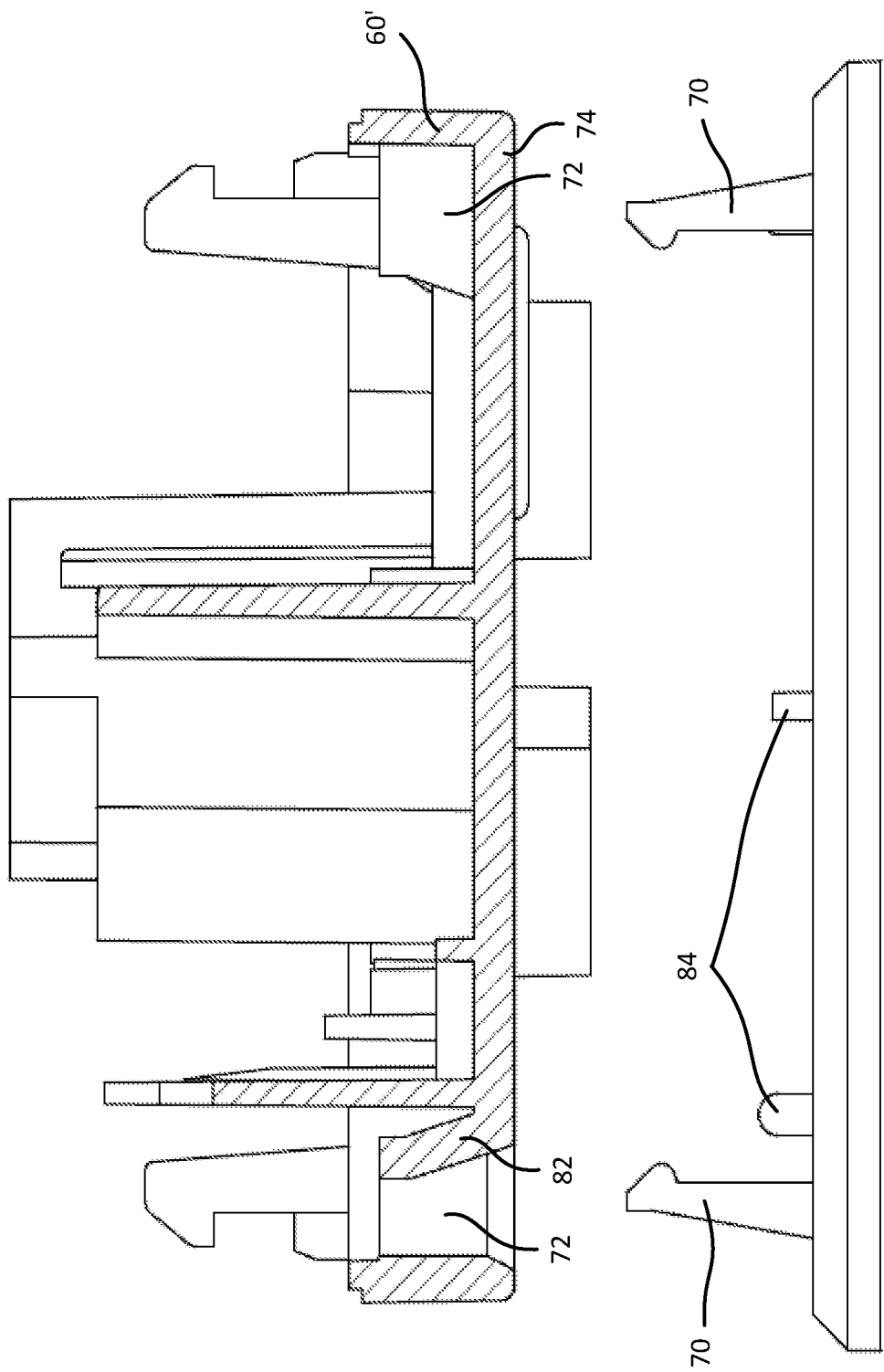
FIG. 17 is a side view of the faceplate and electrical receptacle of FIGS. 15-16 in an unlocked configuration.

One or more tabs 70 may also be provided on the rearward surface 68 of faceplate 63'-63''' for engaging one or more corresponding apertures 72 located on a front surface 74 of the electrical cover 60'-60" or 90'. In the arrangements shown in FIGS. 15-17, the one or more tabs 70 are snap-fit joints connected to the rear surface 68 of faceplate 63' that comprise a hook 76 located at a free-end 78 of a beam 80. During connection of faceplate 63' to the electrical cover 60', the one or more tabs 70 deflect upon insertion into the one or more corresponding apertures 72 of the electrical cover 60'. Once the faceplate 63' has been connected to the electrical cover 60', the one or more tabs 70 engage latch plates 82 located within the one or more apertures 72 of the electrical cover 60' into a locked position, as shown by example in FIG. 16. When a force is applied to remove the faceplate 63' from electrical cover 60', for example, by a force being applied to aperture 64, the one or more tabs 70 deflect to release from latch plates 82. As shown in FIGS. 15 and 17, one or more protrusions 84 may also be provided on the rear surface 68 of faceplate 63' to engage one or more corresponding apertures (not shown) of electrical cover 60' for guiding and retaining faceplate 63' with respect to electrical cover 60'.

Figure 18:
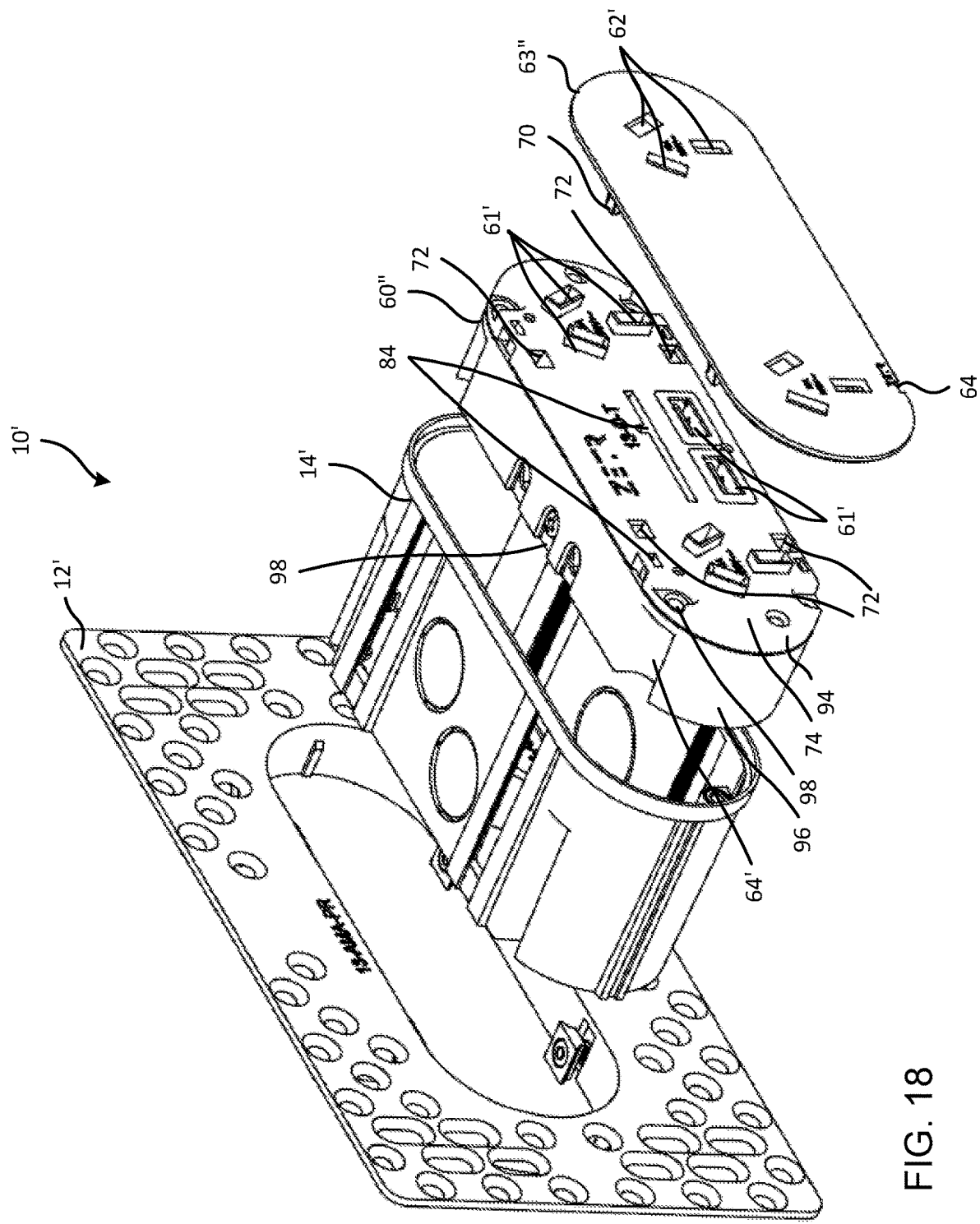
FIG. 18 is an exploded view of the adjustable mounting assembly of FIGS. 10A-12, the faceplate of FIGS. 13-17 and an electrical receptacle.
Figure 19:
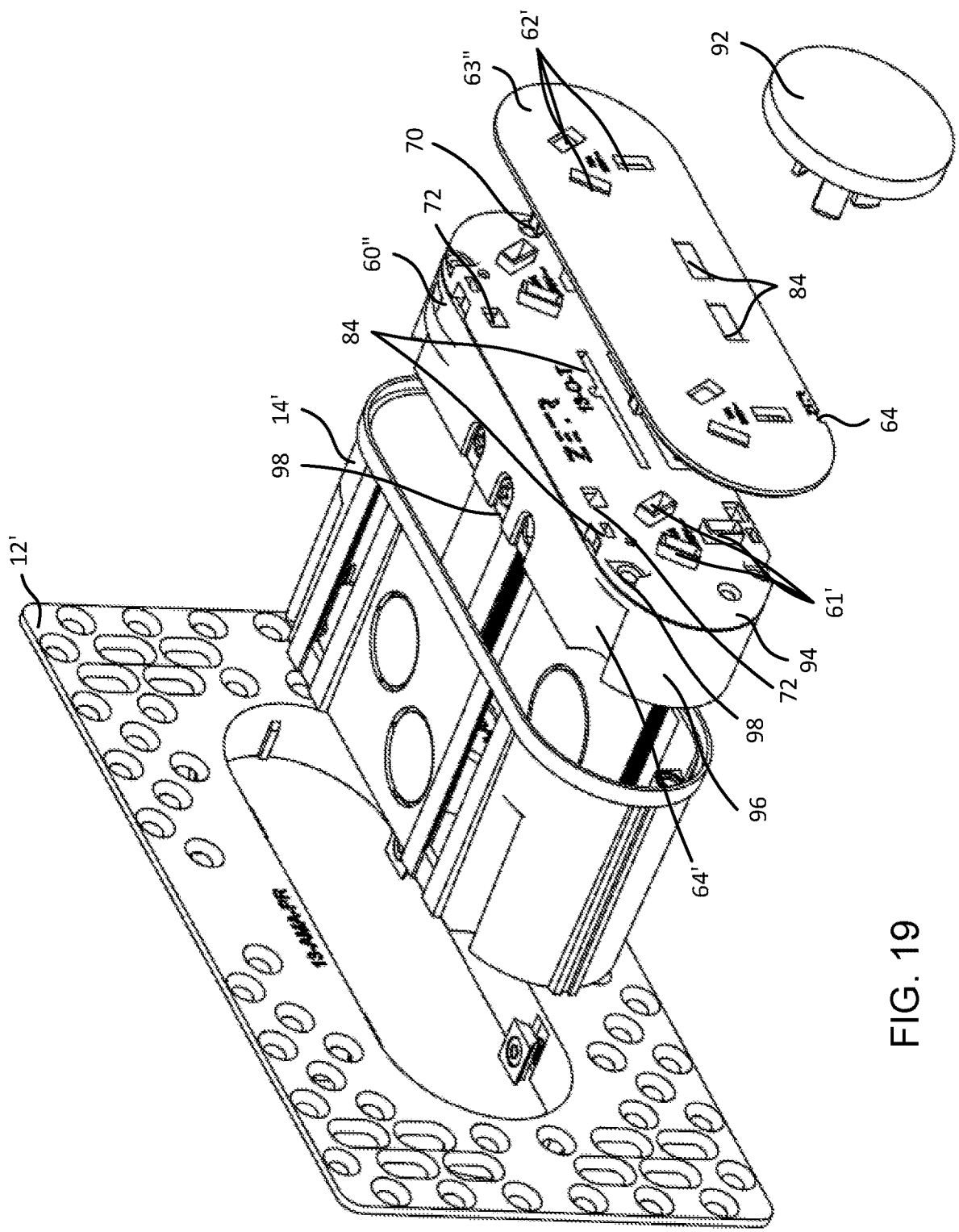
FIG. 19 is an exploded view of the adjustable mounting assembly of FIG. 18 with an outlet cover.
Figure 20:
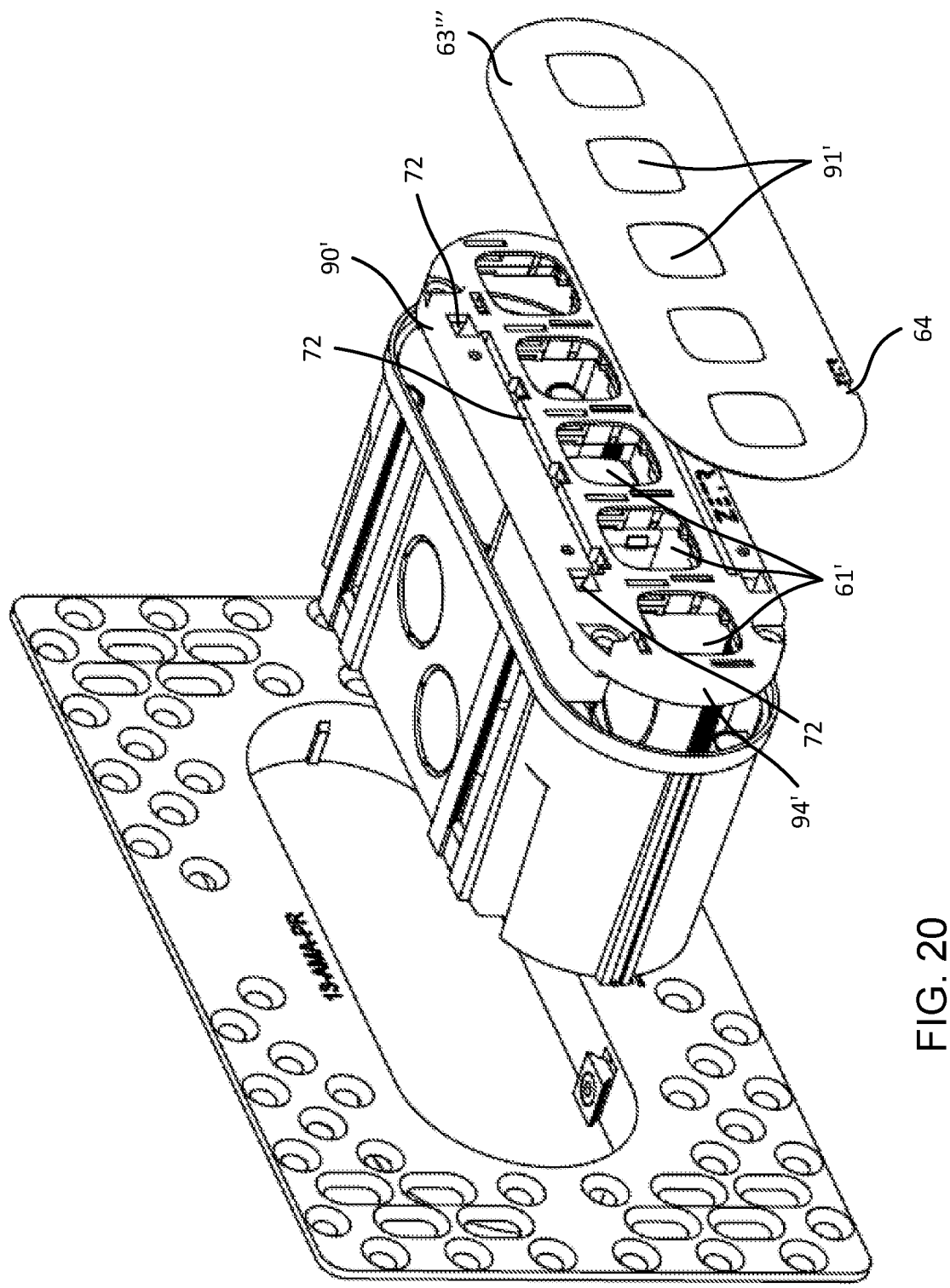
FIG. 20 is an exploded view of the adjustable mounting assembly of FIGS. 10A-12, an electrical switch and a faceplate.

In the arrangement shown in FIG. 20, the electrical cover 60''' includes a cover plate 94' having one or more apertures 72 for receiving one or more tabs 70 and/or protrusions of faceplate 63''' and one or more slots 91' shaped to receive an electrical switch assembly. In another arrangement shown in FIGS. 18-19, the electrical cover 60" comprises a cover plate 94 and body 96. The cover plate 94 comprises one or more protruding receptors 61', one or more apertures 72 for engaging the one or more tabs 70 and/or protrusions 84 of faceplate 63' or 63". The cover plate 94 is further provided with one or more apertures 98 for engaging one or more fasteners to affix the cover plate 94 to the body 96 of the electrical cover 60". The body 96 is provided with one or more guiding channels 64', each terminating at a recess within the guiding channel, so that the recesses are adapted to abut against four guides 65' located within the holder 14'. As shown in FIGS. 18-19, the body 96 may further comprise one or more electrical connectors 98 for connecting one or more electrical wires to the electrical cover 60".

It will be appreciated that one or more of the mounting means 12', holder 14', faceplate 63' and/or electrical cover 60' can be of any shape, for example, a square, a rectangle or a circle. In one example, the mounting means 12', holder 14', electrical cover 60' and faceplate 63' are shaped as a circle for receiving a single round electrical outlet. In another example, the mounting means 12', holder 14' electrical cover 60' and faceplate 63' are shaped as a rectangle for receiving one or more electrical switches and/or one or more electrical outlets.

It will be understood that the invention disclosed and defined in this specification extends to all alternative combinations of two or more of the individual features mentioned or evident from the text or drawings. All of these different combinations constitute various alternative aspects of the invention.

What is claimed is:

1. An adjustable mounting assembly for mounting an electrical module relative to a supporting surface, comprising:

mounting means adapted for embedded anchorage relative to the supporting surface and including an opening;

a holder including an aperture for receiving and holding the electrical module, and one or more tracks provided within a sidewall of the holder and accessible via the aperture, wherein the holder is adapted for moveable engagement with the mounting means within the opening to facilitate adjustment of a position of the electrical module relative to the supporting surface; and fastening means for fastening the holder to the mounting means, the fastening means configured for engagement with the one or more tracks and accessible for unfastening and refastening via the aperture to facilitate re adjustment of the position of the electrical module relative to the supporting surface.

2. The assembly of claim 1 wherein the holder includes an engaging surface shaped to correspond with a corresponding engaging surface of the mounting means to facilitate the movable engagement.

3. The assembly of claim 2 wherein the engaging surface of the holder includes an oval-shaped cross-section, and the corresponding engaging surface of the mounting means includes a similar oval-shaped cross-section.

4. The assembly of claim 1 wherein, in a fastened configuration, the opening of the mounting means is unobstructed by the fastening means.

5. The assembly of claim 1 wherein the one or more tracks of the holder includes at least one angled contacting surface for contact with at least one corresponding angled contacting surface of the fastening means.

6. The assembly of claim 5 wherein the at least one angled contacting surface of the holder comprises a plurality of serrations for engaging the at least one corresponding angled contacting surface of the fastening means.

7. The assembly of claim 5 wherein the at least one corresponding angled contacting surface of the fastening means comprises a plurality of serrations for engaging the at least one angled contacting surface of the holder.

8. The assembly of claim 1 wherein the supporting surface is a substantially flat panel, and the mounting means includes a substantially flat portion for substantial alignment with a rear side of the panel and wherein the holder is adapted for moveable engagement with the opening of the mounting means to facilitate adjustment of a position of the electrical module to align with a front face of the supporting surface, the adjustment accommodating a range of thicknesses of the panel.

9. The assembly of claim 1 further comprising a faceplate for covering an exposed side of the aperture of the holder.

10. The assembly of claim 9 wherein the faceplate comprises one or more tabs for engaging one or more corresponding apertures of the electrical module.

11. The assembly of claim 1 wherein with the mounting means comprises:
a substantially flat portion for the embedded anchorage in substantial alignment with the supporting surface; and
a support defining the opening and comprising a flange integrally formed with the mounting means and extending substantially transverse to the flat portion.

12. The assembly of claim 11 wherein the fastening means comprises one or more screws and the support comprises one or more threaded apertures each for engaging one of the screws.

13. The assembly of claim 11, wherein the flange of the support comprises one or more tongues extending along the flange for engaging one or more grooves located on an exterior surface of a sidewall of the holder.

14. The assembly of claim 1 wherein the holder comprises one or more puncturable openings for receiving one or more electrical wires for connecting to the electrical module.

15. The assembly of claim 9 wherein the faceplate comprises an aperture for receiving a tool for removing the faceplate from the holder.

16. An adjustable mounting assembly for mounting an electrical module relative to a supporting surface, comprising:
a support plate having a substantially flat surface surrounding an opening and configured for embedded anchorage relative to the supporting surface;
a housing comprising a peripheral wall having a circumference that fits within the support plate opening defining an aperture through the housing and a track formed along an inner surface of the peripheral wall, wherein aperture is sized and shaped to receive an electrical module; and
a fastener operable to slidably couple the housing to the support plate, the fastener comprising a guide configured to fit within the track enabling a position of the housing to be adjusted with respect to the support plate to facilitate positioning the electrical module flush with the supporting surface.

17. The adjustable mounting assembly of claim 16 wherein:
the fastener includes a frame having rim facing the support plate, a plurality of first threaded openings formed through the rim into the frame that enable the fastener to be coupled to the support plate by a plurality of first screws, and a second threaded opening aligned with the track and formed through the frame in a direction perpendicular to the plurality of first threaded openings; and
the guide comprises a washer coupled to the frame by a second screw threaded into the second threaded opening.

18. The adjustable mounting assembly of claim 17 wherein the track and the washer comprise complementary angled surfaces.

19. The adjustable mounting assembly of claim 17 wherein the frame includes an inner peripheral surface that defines a fastener opening aligned with the support plate opening and wherein the circumference of the housing fits within the fastener opening.

20. The adjustable mounting assembly of claim 17 wherein the housing includes first and second tracks formed along the inner surface of the peripheral wall in in an oppositional relationship with each other and the fastener includes first and second guides configured to fit within the first and second tracks, respectively.

* * * * *